(12) United States Patent
Shimura et al.

(10) Patent No.: US 11,235,989 B2
(45) Date of Patent: *Feb. 1, 2022

(54) COMPOSITE POROUS HOLLOW FIBER MEMBRANE, COMPOSITE POROUS HOLLOW FIBER MEMBRANE MODULE, AND OPERATION METHOD FOR COMPOSITE POROUS HOLLOW FIBER MEMBRANE MODULE

(71) Applicant: TORAY INDUSTRIES, INC., Tokyo (JP)

(72) Inventors: Shun Shimura, Shiga (JP); Masayuki Hanakawa, Shiga (JP); Kenta Iwai, Shiga (JP); Tamotsu Kitade, Shiga (JP); Masahiro Kimura, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 415 days.

This patent is subject to a terminal disclaimer.

(21) Appl. No.: 16/312,768

(22) PCT Filed: Jun. 23, 2017

(86) PCT No.: PCT/JP2017/023295
§ 371 (c)(1),
(2) Date: Dec. 21, 2018

(87) PCT Pub. No.: WO2017/222063
PCT Pub. Date: Dec. 28, 2017

(65) Prior Publication Data
US 2019/0330085 A1  Oct. 31, 2019

(30) Foreign Application Priority Data

Jun. 24, 2016  (JP) ............................. JP2016-125526

(51) Int. Cl.
*C02F 1/44* (2006.01)
*B01D 63/02* (2006.01)
(Continued)

(52) U.S. Cl.
CPC ................ *C02F 1/44* (2013.01); *B01D 63/02* (2013.01); *B01D 65/02* (2013.01); *B01D 65/08* (2013.01);
(Continued)

(58) Field of Classification Search
None
See application file for complete search history.

(56) References Cited

U.S. PATENT DOCUMENTS 7,182,870 B2  2/2007  Minegishi et al.
7,258,914 B2  8/2007  Morikawa et al.
(Continued)

FOREIGN PATENT DOCUMENTS

CN  1759142 A  4/2006
CN  1774468 A  5/2006
(Continued)

OTHER PUBLICATIONS

Chinese Office Action and Search Report for Chinese Application No. 201780039392.4, dated Nov. 26, 2020, with an English translation.
(Continued)

*Primary Examiner* — Jason M Greene
*Assistant Examiner* — Eric J McCullough
(74) *Attorney, Agent, or Firm* — Birch, Stewart, Kolasch & Birch, LLP

(57) ABSTRACT

The present invention relates to a composite porous hollow-fiber membrane including a first layer and a second layer which each include a fluororesin-based polymer, in which at least a part of molecular chains of the fluororesin-based
(Continued)

10μm polymer is oriented in a longitudinal direction of the composite porous hollow-fiber membrane, the molecular chains of the fluororesin-based polymer have a degree of orientation it in the longitudinal direction of the composite porous hollow-fiber membrane of 0.4 or higher but less than 1.0, the degree of orientation it being calculated with the specific formula.

17 Claims, 6 Drawing Sheets

(51) Int. Cl.

| | | |
|---|---|---|
| *B01D 65/02* | (2006.01) | |
| *B01D 65/08* | (2006.01) | |
| *B01D 69/02* | (2006.01) | |
| *B01D 69/08* | (2006.01) | |
| *B01D 69/12* | (2006.01) | |
| *B01D 71/34* | (2006.01) | |

(52) U.S. Cl.
CPC ............. *B01D 69/02* (2013.01); *B01D 69/08* (2013.01); *B01D 69/12* (2013.01); *B01D 71/34* (2013.01); *B01D 2325/30* (2013.01)

(56) References Cited

U.S. PATENT DOCUMENTS

| | | | |
|---|---|---|---|
| 7,351,338 B2* | 4/2008 | Tada ................... | B01D 67/003 210/500.23 |
| 7,504,034 B2 | 3/2009 | Minegishi et al. | |
| 7,851,024 B2 | 12/2010 | Morikawa et al. | |
| 9,901,883 B2* | 2/2018 | Hanakawa ......... | B01D 67/0018 |
| 2003/0094409 A1 | 5/2003 | Minegishi et al. | |
| 2003/0232184 A1 | 12/2003 | Morikawa et al. | |
| 2005/0258101 A1 | 11/2005 | Minegishi et al. | |
| 2006/0148912 A1 | 7/2006 | Katsurao et al. | |
| 2006/0178480 A1 | 8/2006 | Tada et al. | |
| 2007/0084794 A1 | 4/2007 | Morikawa et al. | |
| 2007/0090051 A1 | 4/2007 | Minegishi et al. | |
| 2007/0144716 A1 | 6/2007 | Doh et al. | |
| 2008/0156722 A1 | 7/2008 | Suzuki et al. | |
| 2014/0094076 A1 | 4/2014 | Mrozinski et al. | |
| 2015/0144550 A1 | 5/2015 | Okamoto et al. | |

FOREIGN PATENT DOCUMENTS

| | | |
|---|---|---|
| CN | 103608389 A | 2/2014 |
| CN | 104379240 A | 2/2015 |
| JP | 2006-263721 A | 10/2006 |
| JP | 2006-297383 A | 11/2006 |
| JP | 2015-142886 A | 8/2015 |
| WO | WO 03/031038 A1 | 4/2003 |
| WO | WO 03/106545 A1 | 12/2003 |
| WO | WO 2004/081109 A1 | 9/2004 |
| WO | WO 2007/010832 A1 | 1/2007 |

OTHER PUBLICATIONS

International Search Report, issued in PCT/JP2017/023295, PCT/ISA/210, dated Aug. 8, 2017.

Written Opinion of the International Searching Authority, issued in PCT/JP2017/023295, PCT/ISA/237, dated Aug. 8, 2017.

* cited by examiner

10μm

10μm

COMPOSITE POROUS HOLLOW FIBER MEMBRANE, COMPOSITE POROUS HOLLOW FIBER MEMBRANE MODULE, AND OPERATION METHOD FOR COMPOSITE POROUS HOLLOW FIBER MEMBRANE MODULE

TECHNICAL FIELD

The present invention relates to a composite porous hollow-fiber membrane and a composite porous hollow-fiber membrane module which are usable in applications including water treatment, production of foods or chemical products, and medical applications and relates to methods for operating the composite porous hollow-fiber membrane module.

BACKGROUND ART

Separation membranes (also called porous membranes) are utilized in filtration in various fields including the field of water treatment such as water purification treatment and wastewater treatment, medical applications including blood purification, and the food industry.

The separation membranes suffer pore clogging when used in filtration. As the clogging proceeds, the filtration pressure increases, and this gradually makes it difficult to maintain a filtration rate. A method has hence been disclosed in which a filtration operation is conducted for a certain time period and the separation membranes are then cleaned. There are cases where separation membranes are cleaned by chemical cleaning with an acid such as hydrochloric acid, citric acid, or oxalic acid, an alkali such as an aqueous sodium hydroxide solution, chlorine, or a surfactant. Because of this, separation membranes employing fluororesin-based polymers represented by poly(vinylidene fluoride) as materials having high chemical resistance have been developed in recent years and are utilized.

Patent Document 1 indicates that a porous hollow-fiber membrane which is includes a poly(vinylidene fluoride)-based resin and in which a longitudinally oriented fibrous texture having a diameter of 0.9 µm to 3 µm accounts for at least 30% of the entire porous hollow-fiber membrane is excellent in terms of strength and pure-water permeation performance. The document describes a process for producing a hollow-fiber membrane, in which a solution of a poly(vinylidene fluoride)-based resin is pressurized in a liquid feed line before being ejected through a spinneret.

Patent Documents 2 and 3 disclose a hollow membrane having both a three-dimensional network structure and a spherical structure.

Furthermore, Patent Document 4 describes a technique in which a composition obtained by adding a plasticizer and a good solvent for vinylidene-fluoride-based resins to a vinylidene-fluoride-based resin is extruded into a membrane shape and cooled preferentially from one surface thereof to solidify the extrudate and the membrane thus formed is subjected to extraction of the plasticizer therefrom and then drawn, thereby forming a porous membrane. Patent Document 4 indicates that in the porous membrane, a crystal oriented portion and a crystal non-oriented portion (randomly oriented portion) are recognized in analysis by X-ray diffractometry.

BACKGROUND ART DOCUMENT

Patent Document

Patent Document 1: JP-A-2006-297383
Patent Document 2: WO 03/106545
Patent document 3: JP-A-2006-263721
Patent Document 4: WO 04/081109

SUMMARY OF THE INVENTION

Problems that the Invention is to Solve

Depending on filtration conditions or cleaning conditions, the membranes suffer large force. The conventional membranes are still insufficient for use in external pressure type cross flow filtration, which is for inhibiting the clogging caused by microorganism culture solutions.

An object of the present invention, which has been achieved in view of the problems of background art techniques described above, is to provide a composite porous hollow-fiber membrane which has excellent chemical durability due to a fluororesin-based polymer having high chemical resistance and which further has excellent physical durability and a controlled membrane-outer-surface pore diameter, thereby giving a composite porous hollow-fiber membrane module that can be stably operated over a long period while inhibiting the flow channels and the pores in the membranes from being clogged by microorganisms, etc.

Another object of the present invention is to provide a composite porous hollow-fiber membrane module that can be stably operated over a long period while inhibiting the flow channels and the pores in the membranes from being clogged by microorganisms, and to provide methods for operating the module.

Means for Solving the Problems

The present inventors diligently made investigations and, as a result, have found that those problems can be overcome by configuring a composite porous hollow-fiber membrane so that molecular chains of the fluororesin-based polymer have a degree of orientation π in the longitudinal direction of the membrane of 0.4 or higher but less than 1.0. The present invention has been accomplished based on this finding.

The present invention includes the following configurations [1] to [14].

[1] A composite porous hollow-fiber membrane including a first layer and a second layer which each include a fluororesin-based polymer, in which at least a part of molecular chains of the fluororesin-based polymer is oriented in a longitudinal direction of the composite porous hollow-fiber membrane, the molecular chains of the fluororesin-based polymer have a degree of orientation π in the longitudinal direction of the composite porous hollow-fiber membrane of 0.4 or higher but less than 1.0, the degree of orientation π being calculated with the following formula (1), the first layer has a columnar texture oriented in the longitudinal direction of the composite porous hollow-fiber membrane, and the second layer has a three-dimensional network texture and has an average surface-pore diameter of 5.0 nm to 5.0 µm:

$$\text{Degree of orientation } \pi=(180°-H)/180° \quad (1),$$

provided that H is a half-value width (°) of a circumferential-direction diffraction intensity distribution of a wide-angle X-ray diffraction image.

[2] The composite porous hollow-fiber membrane according to [1], in which the columnar texture has a short-side length of 0.5 µm to 3 µm and has an aspect ratio of 3 or higher.

[3] The composite porous hollow-fiber membrane according to [1] or [2], in which the columnar texture has a thickness uniformity of 0.60 or higher.

[4] The composite porous hollow-fiber membrane according to any one of [1] to [3], in which the half-value width H is a half-value width of an intensity distribution obtained by wide-angle X-ray diffractometry, by scanning, in a circumferential direction, a crystal peak (2θ=20.4°) assigned to a (110) plane of poly(vinylidene fluoride).

[5] The composite porous hollow-fiber membrane according to any one of [1] to [4], in which, in a case where measuring points on the composite porous hollow-fiber membrane which are located at intervals of 1 cm in the longitudinal direction thereof are examined by wide-angle X-ray diffractometry, the degree of orientation π is 0.4 or higher but less than 1.0 in 80% or more of the measuring points.

[6]
The composite porous hollow-fiber membrane according to any one of [1] to [5], in which the columnar texture has an average value v of a Raman orientation parameter obtained by Raman spectrometry of 3.0 or larger.

[7] The composite porous hollow-fiber membrane according to any one of [1] to [6], in which the fluororesin-based polymer is poly(vinylidene fluoride).

[8] The composite porous hollow-fiber membrane according to any one of [1] to [7], in which the first layer has a porosity of 50-80%.

[9] The composite porous hollow-fiber membrane according to any one of [1] to [8], which has a pure-water permeation performance at 50 kPa and 25° C. of 0.1 $m^3/m^2/hr$ or higher and a breaking strength of 25 MPa or higher.

[10] A composite porous hollow-fiber membrane module including:
a tubular case having, in a height direction thereof, a first end and a second end;
a plurality of the composite porous hollow-fiber membranes according to any one of [1] to [9] disposed in the tubular case;
a fluid inflow/outflow port located in a sidewall of the tubular case further toward the second-end side than the center of the tubular case; and a fluid inflow/outflow port located in a first-end-side end face of the tubular case,
in which hollows of the composite porous hollow-fiber membranes are opened on the second-end side and closed on the first-end side.

[11] A method for operating the composite porous hollow-fiber membrane module according to [10], the method including simultaneously performing the following step (A) and step (B):
(A) a step in which a liquid to be filtrated is introduced into the tubular case through the fluid inflow/outflow port located in the first-end-side end face, and the liquid to be filtrated is discharged from the tubular case through the fluid inflow/outflow port located in the sidewall on the second-end side; and
(B) a step in which a filtrate is taken out from the hollows of the composite porous hollow-fiber membranes toward the second end.

[12] A method for operating the composite porous hollow-fiber membrane module according to [10], the method including simultaneously performing the following step (B) and step (C):
(B) a step in which a filtrate is taken out from the hollows of the composite porous hollow-fiber membranes toward the second end; and
(C) a step in which a liquid to be filtrated is introduced into the tubular case through the fluid inflow/outflow port located in the sidewall on the second-end side, and the liquid to be filtrated is discharged from the tubular case through the fluid inflow/outflow port located in the first-end-side end face.

[13] The method for operating the composite porous hollow-fiber membrane module according to [11] or [12], in which the step (B) and the following step (D) are repeatedly performed:
(D) a step in which, after the step (B), a fluid is filtrated by passing the fluid from the hollows of the composite porous hollow-fiber membranes on the second-end side to an outside of the composite porous hollow-fiber membranes.

[14] The method for operating the composite porous hollow-fiber membrane module according to [13], in which the step (B) and the step (D) are repeatedly performed and the following step (E) is further performed:
(E) a step in which a gas is introduced into the tubular case through the fluid inflow/outflow port located in the first-end-side end face, and the gas is discharged from the tubular case through the fluid inflow/outflow port located in the sidewall on the second-end side.

Advantage of the Invention

The present invention provides a composite porous hollow-fiber membrane which has excellent chemical durability due to a fluororesin-based polymer having high chemical resistance and which further has excellent physical durability and a controlled membrane-outer-surface pore diameter, thereby giving a composite porous hollow-fiber membrane module that can be stably operated over a long period while inhibiting the flow channels and the pores in the membranes from being clogged by microorganisms, etc.

The present invention further provides: a composite porous hollow-fiber membrane module that can be stably operated over a long period while inhibiting the flow channels and the pores in the membranes from being clogged by microorganisms; and methods for operating the module.

MODE FOR CARRYING OUT THE INVENTION

1. Composite Porous Hollow-Fiber Membrane

Figure 1:
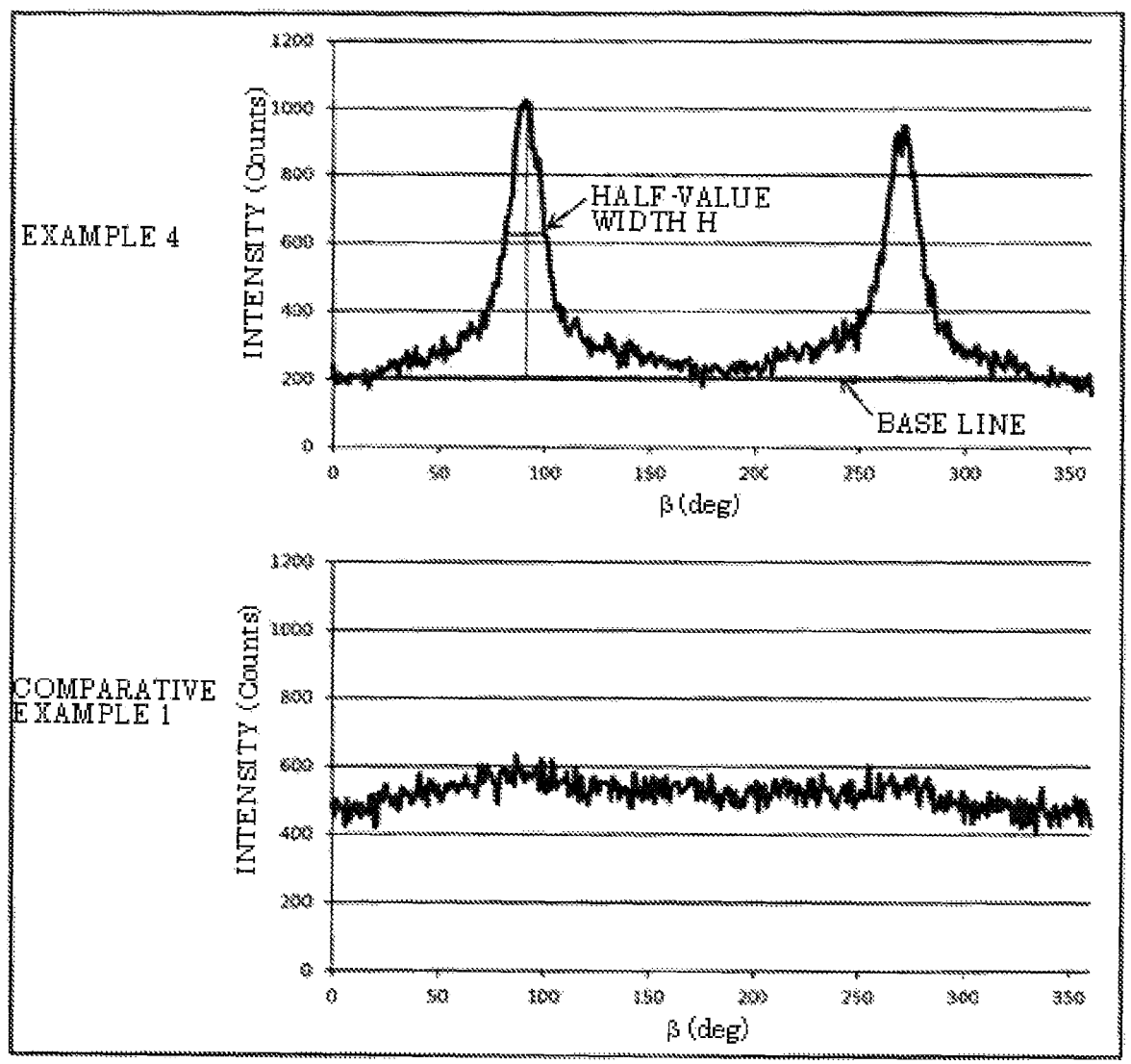
FIG. 1 is a diagram showing azimuth-direction intensity distributions at 2θ=20.4° of the drawn hollow fibers of Example 4 and Comparative Example 1.

The composite porous hollow-fiber membrane of the present invention includes a first layer and a second layer which each include a fluororesin-based polymer. The first layer has a columnar texture, and the second layer has a three-dimensional network texture.

1-1. Degree of Orientation Determined by X-Ray Diffractometry

In the composite porous hollow-fiber membrane, the molecular chains of the fluororesin-based polymer have a degree of orientation π in the longitudinal direction of the composite porous hollow-fiber membrane of 0.4 or higher but less than 1.0. The degree of orientation π is calculated from a half-value width H (°) obtained by wide-angle X-ray diffractometry, using the following formula (1).

$$\text{Degree of orientation } \pi = (180° - H)/180° \tag{1}$$

(H is a half-value width (°) of a circumferential-direction diffraction intensity distribution of a wide-angle X-ray diffraction image.)

Due to the orientation of the molecular chains of the fluororesin-based polymer, the composite porous hollow-fiber membrane can have strength which enables the hollow-fiber membrane to withstand use under such conditions that the membrane suffers large force, as in cross flow filtration or air scrubbing.

A method for determining the orientation and the degree of orientation π, in the longitudinal direction of the composite porous hollow-fiber membrane, of the molecular chains of the fluororesin-based polymer are explained below in detail.

In order to calculate the degree of orientation π, the composite porous hollow-fiber membrane is set on a fiber sample table so that the longitudinal direction of the composite porous hollow-fiber membrane is vertical. Incidentally, the short-side direction of the composite porous hollow-fiber membrane is a direction parallel with a radial direction of the hollow fiber, while the longitudinal direction is a direction perpendicular to the short-side direction.

Analysis by X-ray diffractometry gives an annular diffraction image called a Debye ring (Debye-Scherrer ring). In a non-oriented sample, no large change in diffraction intensity is observed throughout the Debye ring. In an oriented sample, however, the Debye ring is uneven in intensity and has an intensity distribution. Consequently, the degree of orientation can be calculated from this intensity distribution using formula (1).

More particularly, in cases when the molecular chains are in a non-oriented state and 2θ/θ scanning is conducted in the short-side direction (that is, when a diffraction pattern showing a diffraction intensity distribution in a radial direction of the Debye ring is obtained), then a peak is observed in a position around a diffraction angle 2θ=20°. The abscissa of the diffraction pattern thus obtained is X-ray diffraction angle 2θ and the ordinate thereof is diffraction intensity. Furthermore, the diffraction angle 2θ is fixed at the position of the peak, i.e., around 20°, and the sample is scanned in the direction of azimuth β. Thus, a diffraction pattern in which the abscissa indicates the azimuth β and the ordinate indicates diffraction intensity (i.e., a diffraction intensity distribution along the circumferential direction of the Debye ring in the position of diffraction angle 2θ=20°) is obtained. In the non-oriented sample, the diffraction intensity is approximately constant throughout the circumferential 360° range of the Debye ring.

Meanwhile, in the case where the molecular chains of the fluororesin-based polymer have been oriented in the longitudinal direction of the composite porous hollow-fiber membrane, a high diffraction intensity is observed on the Debye ring at around 2θ=20° at an azimuth (i.e., on the equator) corresponding to the short-side direction of the composite porous hollow-fiber membrane and low diffraction intensities are observed in other portions. Namely, the oriented sample gives a Debye-ring-radial-direction diffraction intensity distribution which has a diffraction peak at around 2θ=20°, like the non-oriented sample, and gives a circumferential-direction distribution in which a diffraction peak is observed at an azimuth corresponding to the short-side direction of the composite porous hollow-fiber membrane, unlike the non-oriented sample. For example, FIG. 1, which will be described later, is a diagram showing an azimuth-direction intensity distribution at 2θ=20.40 of the drawn hollow fiber of Example 4, and peaks are observed therein at around β=90° and β=270°.

In the above explanation, the position of a diffraction peak in the radial direction of the Debye ring (namely, the value of 2θ corresponding to the diffraction peak) was taken as "around 20°". However, the value of 2θ varies depending on the structure of the polymer and composition, and there are cases where 2θ ranges from 15° to 25°. For example, in cases when a poly(vinylidene fluoride) homopolymer having α crystals or β crystals is analyzed by X-ray diffractometry, a diffraction peak assigned to the (110) plane of the α crystal or β crystal, i.e., assigned to a plane parallel with the molecular chains, is observed at around 2θ=20.4°.

As described above, by fixing the value of diffraction angle 2θ and examining intensity along the direction of azimuth (circumferential direction) from 0° to 360°, an azimuth-direction intensity distribution is obtained. This intensity distribution is considered to be an intensity distribution obtained by scanning a crystal peak of a diffraction image in the circumferential direction thereof. In the case where the ratio between the intensity at an azimuth of 180° (longitudinal direction) and the intensity at an azimuth of 90° (short-side direction) is 0.80 or less or is 1.25 or larger, this intensity distribution in the direction of that azimuth is regarded as having a peak, and the width of the peak as measured at a position corresponding to a half of the height of the peak (half-value width H) is determined.

The half-value width H is substituted into formula (1) to calculate the degree of orientation π.

The degree of orientation π, in the longitudinal direction of the composite porous hollow-fiber membrane, of the molecular chains of the fluororesin-based polymer according to the present invention is in the range of 0.4 or higher but less than 1.0, preferably 0.5 or higher but less than 1.0, more preferably 0.6 or higher but less than 1.0. Since the degree of orientation π is 0.4 or higher, the composite porous hollow-fiber membrane has enhanced mechanical strength. Since the degree of orientation π is less than 1.0, the composite porous hollow-fiber membrane has enhanced toughness.

It is preferable that in the case where measuring points on the composite porous hollow-fiber membrane which are located at intervals of 1 cm in the longitudinal direction thereof are examined by wide-angle X-ray diffractometry, the degree of orientation π is 0.4 or higher but less than 1.0 in 80% or more of the measuring points.

In the case where an intensity distribution obtained by scanning a crystal peak in the circumferential direction is one in which the ratio between the intensity at an azimuth of 180° and the intensity at an azimuth of 90° exceeds 0.80 but less than 1.25, this intensity distribution is regarded as having no peak. That is, the fluororesin-based polymer in this case is deemed to be in a non-oriented state.

In the case where the composite porous hollow-fiber membrane contains α crystals or β crystals of poly(vinylidene fluoride), the half-value width H preferably is one obtained from an intensity distribution obtained by wide-angle X-ray diffractometry, by scanning, in the circumferential direction, a crystal peak (2θ=20.40) assigned to the (110) plane of the α crystal or β crystal of the poly(vinylidene fluoride).

In the information obtained by an examination by X-ray diffractometry, the state of orientation of the entire composite porous hollow-fiber membrane is reflected. However, the examination can give the result that the membrane "has orientation", also in the case where molecular chains in some of the layers included in the composite porous hollow-fiber membrane have been oriented and the molecular chains in another layer are in a non-oriented state. For example, in the case where a second layer is formed on a first layer which has been drawn and drawing is not performed after the formation of the second layer, the molecular chains in the first layer have been oriented but the molecular chains in the second layer are in a non-oriented state. Despite this, so long as the molecular chains in the first layer have been oriented, orientation is detected in an examination of the entire composite porous hollow-fiber membrane by X-ray diffractometry. The first layer exerts a greater influence on the diffraction results especially in the case where the thickness of the first layer accounts for 50% or more of the thickness of the composite porous hollow-fiber membrane as will be described later.

1-2. Layer Structure

The composite porous hollow-fiber membrane includes at least a first layer and a second layer.

(A) First Layer

In cases when a longitudinal section of the separation membrane is photographed with a scanning electron microscope at a magnification of 3,000 times, a portion where a columnar texture is observed can be identified as the first layer. The first layer has a columnar texture oriented in the longitudinal direction of the composite porous hollow-fiber membrane. The first layer includes a fluororesin-based polymer.

(A-1) Configuration of First Layer

It is preferable that a main structure in the first layer is a columnar texture. The proportion of the columnar texture in the first layer is preferably 80% by weight or higher, more preferably 90% by weight or higher, even more preferably 95% by weight or higher. The first layer may be constituted of the columnar texture only. In this case, the first layer can be expressed as a mass of columnar textures.

More specifically, it is preferable that the first layer includes, as a main structure thereof, a columnar texture which contains a fluororesin-based polymer as a main component.

In this description, the expression "X contains Y as a main component" means that the proportion of Y in X is 80% by weight or higher, or 90% by weight or higher, or 95% by weight or higher. X may be constituted of Y only. The first layer may be constituted of a fluororesin-based polymer only. The expression "X contains Y as a main component" can be read, in other words, as "X is based on Y".

The expression "oriented in the longitudinal direction" means that out of the angles formed by the longitudinal direction of the columnar texture and the longitudinal direction of the composite porous hollow-fiber membrane, the acute angle is within 20°.

The first layer may contain a texture other than the columnar texture. Examples of the structure other than the columnar texture include a spherical texture having an aspect ratio (longitudinal length/short-side length) of less than 3. It is preferable that the short-side length and longitudinal length of the spherical texture are in the range of 0.5 μm to 3 μm. In the case of using a spherical texture, the composite porous hollow-fiber membrane is inhibited from decreasing in strength and can retain satisfactory pure-water permeation performance so long as the short-side length and longitudinal length of the spherical texture are within the range shown above.

The proportion of the spherical texture in the first layer is preferably 20% by weight or less, 10% by weight or less, 5% by weight or less, or less than 1% by weight.

The occupancy (%) of each texture in the first layer is determined according to the following formula (6) after taking a photograph of a first-layer portion of a longitudinal section of the composite porous hollow-fiber membrane using an SEM (scanning electron microscope) or the like at a magnification enabling clear identification of a columnar texture and a spherical texture, preferably at a magnification of 1,000-5,000 times. It is preferable that in order to heighten the accuracy, sections of arbitrarily selected twenty or more portions, preferably thirty of more portions, are examined for occupancy and an average value of these is calculated.

$$\text{Occupancy (\%)} = \{(\text{area of each texture in first layer})/(\text{area of first layer in entire photograph})\} \times 100 \quad (6)$$

For determining the area of the first layer in the entire photograph and the area of the texture in the first layer, it is preferred to use, for example, a method in which the area of each photographed texture is converted to a corresponding weight. More specifically, use may be made of a method in which: the photograph taken is printed on paper; the weight of a portion of the paper which corresponds to the first layer in the entire photograph is measured; and the weight of a portion of the paper which corresponds to the texture within the first layer and which has been cut out of the paper is measured. Prior to the photographing with an SEM or the like, the section may be subjected to the resin embedding, dyeing, and cutting with a focused ion beam (FIB) which will be described later; this treatment is preferred because higher examination accuracy is obtained.

From the standpoint of attaining both high pure-water permeation performance and high strength, the porosity of the first layer is preferably 40-90%, or 50-80%, or 50-70%. Porosities thereof not less than 40% give high pure-water permeation performance, while porosities thereof not higher than 90% render high strength possible. Especially in the case where the composite porous hollow-fiber membrane is to be used in cross flow filtration in applications in the fermentation or food industry or where air scrubbing is to be applied to the composite porous hollow-fiber membrane in water treatment, it is desirable that the porosity satisfies any of those ranges.

The porosity of the first layer can be determined from the area of a resin portion of the first layer in the section described above and the area of a void portion of the first layer, using the following formula (5). It is preferable that in order to heighten the accuracy, arbitrarily selected twenty or more sections, preferably thirty of more sections, are examined for porosity and an average value of these is used.

$$\text{Porosity (\%)} = \{100 \times (\text{area of void portion})\}/\{(\text{area of resin portion}) + (\text{area of void portion})\} \quad (5)$$

(A-2) Fluororesin-Based Polymer

In this description, the term "fluororesin-based polymer" means a resin which includes at least one polymer selected from among a vinylidene fluoride homopolymer and vinylidene fluoride copolymers. The fluororesin-based polymer may include multiple kinds of vinylidene fluoride copolymers. Poly(vinylidene fluoride) is preferred as the fluororesin-based polymer.

At least a part of the molecular chains of the fluororesin-based polymer is oriented in the longitudinal direction of the composite porous hollow-fiber membrane.

The vinylidene fluoride copolymers are polymers having a vinylidene fluoride residue structure, and typically are copolymers of vinylidene fluoride monomer with other fluorine-compound monomers, etc. Examples of such copolymers include copolymers of one or more monomers selected from among vinyl fluoride, tetrafluoroethylene, hexafluoropropylene, and trifluorochloroethylene with vinylidene fluoride.

Monomers other than those fluorine-compound monomers, such as, for example, ethylene, may have been copolymerized to such a degree that the effects of the invention are not impaired thereby.

The weight-average molecular weight of the fluororesin-based polymer may be suitably selected in accordance with the strength and water permeability required for the composite porous hollow-fiber membrane. However, the water permeability decreases as the weight-average molecular weight increases, and the strength decreases as the weight-average molecular weight decreases. Consequently, from the standpoint that the composite porous hollow-fiber membrane has strength which enables the hollow-fiber membrane to withstand cross flow filtration operations, it is preferable that the composite porous hollow-fiber membrane has a layer including a fluororesin-based polymer having a weight-average molecular weight of 50,000-1,000,000. In the case of use in the fermentation or food industry, where the composite porous hollow-fiber membrane is frequently subjected to chemical cleaning, the weight-average molecular weight thereof is preferably 100,000-700,000, more preferably 150,000-600,000.

It is preferable that the first layer contains the fluororesin-based polymer as a main component.

(A-3) Columnar Texture (a) Dimensions

The "columnar texture" is a solid material which has a shape elongated in one direction. The aspect ratio (longitudinal length/short-side length) of the columnar texture is preferably 3 or larger.

The "longitudinal length" is the length in the longitudinal direction of the columnar texture. The "short-side length" is an average length in the short-side direction of the columnar texture.

The longitudinal length and the short-side length can be measured in the following manners.

For measuring the longitudinal length, the composite porous hollow-fiber membrane is first cut along the longitudinal direction of the composite porous hollow-fiber membrane. The section obtained is examined using a scanning electron microscope (SEM). The magnification can be varied in accordance with the length of the columnar texture, and is adjusted to such a degree that entire images, over the whole longitudinal direction, of five columnar textures, preferably ten, are included in the field of view. In the case where a columnar texture has unevenness in longitudinal-direction length, the maximum length in the longitudinal direction may be measured as the longitudinal length.

Meanwhile, the short-side length is determined by measuring the short-side-direction length at each of a given number of arbitrary measuring points, in one columnar texture and calculating an average value thereof. The number of measuring points is a value obtained by dividing the longitudinal length (μm) by 1 μm (omit any figures below the decimal point). For example, in the case where the columnar texture has a longitudinal length of 20.5 μm, the number of measuring points is 20. However, in cases when the number is 21 or larger, measurements on arbitrary twenty portions suffice.

The longitudinal length of the columnar texture, although not particularly limited, is preferably 7 μm or larger, more preferably 10 μm or larger, even more preferably 15 μm or larger. The longitudinal length of the columnar texture is, for example, preferably 50 μm or less, more preferably 40 μm or less.

The short-side length of the columnar texture is preferably 0.5 μm to ~3 μm. Short-side lengths thereof within this range are preferred because high strength performance and high pure-water permeation performance are obtained. In cases when the short-side length of the columnar texture is 0.5 μm or larger, the columnar texture itself has enhanced physical strength and, hence, high strength is obtained. In cases when the short-side length of the columnar texture is 3 μm or less, there are larger voids among such columnar textures and, hence, satisfactory pure-water permeation performance is obtained. The short-side length of the columnar texture is more preferably 0.7 μm to 2.5 μm, even more preferably 1 μm to 2 μm.

In the composite porous hollow-fiber membrane of the present invention, preferred ranges of representative values of the longitudinal lengths and short-side lengths of columnar textures are respectively the same as the preferred ranges of the longitudinal length and short-side length of each of the individual columnar textures. With respect to the effect brought about when the representative values are within those ranges, the same explanation on the effect brought about when the dimensions of each columnar texture are within those ranges applies.

A representative value of longitudinal length is determined in the following manner. At each of three, preferably five, positions in the composite porous hollow-fiber membrane, five columnar textures, preferably ten, are examined for longitudinal length in the same manner as in the measurement of longitudinal length. An average value of the obtained values of longitudinal length is determined, and this average can be taken as a representative value of the longitudinal lengths of the columnar textures.

Meanwhile, a representative value of short-side length is determined by determining the short-side length (calculated as an average value) of each of the columnar textures which were examined for determining a representative value of longitudinal length, in the manner described above, and calculating an average value of these.

In the composite porous hollow-fiber membrane of the present invention, the representative value of aspect ratio of columnar textures, which is calculated from the representative value of longitudinal length and the representative value of short-side length, is preferably 3 or higher, more preferably 5 or higher, even more preferably 10 or higher, especially preferably 20 or higher.

In the present invention, it is preferable that the short-side length of the columnar texture is 0.5 μm to 3 μm and the aspect ratio of the columnar texture is 3 or higher.

(b) Thickness Uniformity

The thickness uniformity (average value D which will be described later) of the columnar texture is preferably 0.60 or higher, more preferably 0.70 or higher, even more preferably 0.80 or higher, especially preferably 0.90 or higher.

Although the thickness uniformity can be 1.0 at the most, the columnar texture may have a thickness uniformity less than 1.0.

In cases when the columnar texture in the composite porous hollow-fiber membrane has such high thickness uniformity, that is, when the columnar texture has few constricted portions, the composite porous hollow-fiber membrane has an enhanced elongation.

In cases when the composite porous hollow-fiber membrane retains a high elongation, fiber breakage is less apt to occur even when a load is abruptly imposed. High elongations are hence preferred. Practically, this composite porous hollow-fiber membrane is less apt to break even when external force is abruptly imposed on the composite porous hollow-fiber membrane by a change in liquid flow during cross flow filtration.

The elongation at break of the composite porous hollow-fiber membrane is preferably 50% or higher, more preferably 80% or higher.

Thickness uniformity is explained. The lower the unevenness in short-side-direction length of a columnar texture, the smaller the proportion of constricted portions in the columnar texture and the higher the thickness uniformity thereof. Namely, the lower the unevenness in short-side-direction length, the more the shape of this columnar texture is close to an ideal cylinder.

The thickness uniformity of the columnar texture is determined by comparing first and second cross-sections parallel with the short-side direction of the composite porous hollow-fiber membrane. A method therefor is explained below in detail.

First, a first cross-section and a second cross-section which are parallel with each other are selected. The distance between the first and second cross-sections is 5 µm. With respect to each cross-section, portions constituted of the resin in the first layer are distinguished from void portions therein, and the area of the resin portions and the area of the void portions are measured. Next, the first cross-section is projected on the second cross-section to determine the area of portions in each of which a resin portion of the first cross-section coincides with a resin portion of the second cross-section, i.e., the area of overlaps. Next, with respect to one composite porous hollow-fiber membrane, arbitrary twenty sets of first and second cross-sections are each examined for thickness uniformities A and B using the following formulae (3) and (4).

Thickness uniformity $A$=(area of overlaps)/(area of resin portions in second cross-section)     (3)

Thickness uniformity $B$=(area of overlaps)/(area of resin portions in first cross-section)     (4)

Namely, twenty sets of thickness uniformities A and B are obtained for the one composite porous hollow-fiber membrane. The larger the value thereof, the more the membrane is uniform in columnar-texture thickness.

Next, with respect to each set, an average value C of the thickness uniformities A and B is calculated. Namely, twenty average values C are obtained for the one composite porous hollow-fiber membrane. An average value D of these average values C is further calculated. This average value D is the thickness uniformity of the columnar texture in this composite porous hollow-fiber membrane.

In the case where 80% or more of the twenty average values C calculated for one composite porous hollow-fiber membrane are 0.60 or larger, this composite porous hollow-fiber membrane is considered to have a columnar texture.

In preparation for the determination of thickness uniformity, it is preferred to embed the composite porous hollow-fiber membrane in a resin, e.g., an epoxy resin, and dye the epoxy or other resin with osmium, etc. beforehand, in order to clearly distinguish resin portions from void portions. Such resin embedding and dyeing brings about higher examination accuracy, because the void portions are filled with the epoxy or other resin and the cutting with a focused ion beam, which will be described later, gives cross-sections in which portions constituted of the fluororesin-based polymer and void portions (i.e., epoxy resin portions) can be clearly distinguished from each other.

It is preferable that a scanning electron microscope (SEM) equipped with a focused ion beam (FIB) irradiation device is used in order to obtain the first and second cross-sections parallel with the short-side direction of the composite porous hollow-fiber membrane. The composite porous hollow-fiber membrane is cut with an FIB to obtain a section parallel with the short-side direction of the composite porous hollow-fiber membrane, and the cutting with an FIB and an SEM examination are repeatedly conducted 200 times at intervals of 50 nm along the longitudinal direction of the composite porous hollow-fiber membrane. By this consecutive examination of cross-sections, information concerning a depth of 10 µm can be obtained. Among these sections, arbitrary sections which are parallel with each other and are apart from each other at a distance of 5 µm are selected as a first cross-section and a second cross-section, and a thickness uniformity can be determined therefrom using the formulae (3) and (4) described above. The examination may be conducted at any magnification so long as the columnar texture and the spherical texture can be clearly observed. For example, a magnification of 1,000-5,000 times may be used.

(c) Composition

The columnar texture includes a fluororesin-based polymer. It is preferable that the columnar texture includes a fluororesin-based polymer as a main component. The proportion of the fluororesin-based polymer in the columnar texture is preferably 80% by weight or higher, more preferably 90% by weight or higher, even more preferably 95% by weight or higher. The columnar texture may be constituted of the fluororesin-based polymer only.

In other words, the first layer includes a solid matter including a fluororesin-based polymer, and at least some of the solid matter constitutes the columnar texture. In the solid matter including a fluororesin-based polymer in the first layer, the proportion of a portion of the solid matter which constitutes the columnar texture is preferably 80% by weight or higher, more preferably 90% by weight or higher, even more preferably 95% by weight or higher.

The columnar texture at least includes a fluororesin-based polymer oriented in the longitudinal direction of the composite porous hollow-fiber membrane.

(A-4) Raman Spectrometry

The orientation of molecular chains can be ascertained also by orientation analysis by Raman spectrometry. In Raman spectrometry, the degree of orientation of molecular chains in the columnar texture, which has been described above, can be determined. First, the composite porous hollow-fiber membrane is cut with a microtome along the longitudinal direction of the composite porous hollow-fiber membrane to thereby obtain sections of the membrane. Laser Raman analysis is conducted at intervals of 1 µm along the longitudinal direction of a columnar texture while examining the thus-obtained sections with an optical microscope and thereby ascertaining the columnar texture. The number of measuring points for one columnar texture is a value obtained by dividing the longitudinal length (μm) of the columnar texture, which has been described above, by 1 μm (omit any figures below the decimal point). For example, in the case where the columnar texture has a longitudinal length of 20.5 μm, the number of measuring points is 20.

Intense Raman scattering is obtained in cases when the direction of the vibration of molecular chains coincides with the direction of the polarization of the incident light. Because of this, the degree of orientation can be determined by suitably selecting a mode of vibration in the direction parallel with the molecular chains and a mode of vibration in a direction perpendicular to the molecular chains and calculating a ratio between the scattering intensities thereof.

For example, in the case where the fluororesin-based polymer is a poly(vinylidene fluoride) homopolymer, a Raman band at around 1,270 cm$^{-1}$ is assigned to a coupling mode involving $CF_2$ (fluorocarbon) stretching vibration and CC (carbon-carbon) stretching vibration. The direction of vibration in these vibration modes is parallel with the molecular chains. Meanwhile, the direction of vibration for a Raman band at around 840 cm$^{-1}$ is perpendicular to the molecular chains.

Consequently, a Raman orientation parameter can be calculated using the following formula (2). The higher the orientation in the longitudinal direction of the composite porous hollow-fiber membrane, the larger the value of Raman orientation parameter. The Raman orientation parameter is 1 when the molecular chains are in a non-oriented state, and shows a value smaller than 1 when the orientation in the short-side direction is high.

$$\text{Raman orientation parameter} = (I1270\text{-parallel}/I840\text{-parallel})/(I1270\text{-vertical}/I840\text{-vertical}) \quad (2)$$

In formula (2),

I1270-parallel: Raman band intensity at 1,270 cm$^{-1}$ under parallel conditions, I11270-vertical: Raman band intensity at 1,270 cm$^{-1}$ under vertical conditions, I840-parallel: Raman band intensity at 840 cm$^{-1}$ under the parallel conditions, I840-vertical: Raman band intensity at 840 cm$^{-1}$ under the vertical conditions, the parallel conditions: the longitudinal direction of the composite porous hollow-fiber membrane is parallel with the polarization direction, the vertical conditions: the longitudinal direction of the composite porous hollow-fiber membrane is orthogonal with the polarization direction.

In one composite porous hollow-fiber membrane, ten different columnar textures each having a length in the range of 0.5 to 1.5 times the representative value of longitudinal length of columnar textures described above are selected. Each columnar texture is subjected to laser Raman analysis at intervals of 1 μm in the manner described above, and the orientation parameter for each measuring point is calculated using formula (2). An average value of the thus-obtained values is taken as the average value v of Raman orientation parameter.

Furthermore, an operation in which a largest orientation parameter and a smallest orientation parameter are selected from among the orientation parameters for the measuring points in one columnar texture is performed with respect to the ten different columnar textures. An average value of the ten selected largest orientation parameters and an average value of the ten selected smallest orientation parameters are calculated respectively as a maximum Raman orientation parameter M and as a minimum Raman orientation parameter m.

It is preferred to subject twenty different columnar textures to the examination in order to obtain, with satisfactory accuracy, the average value v of Raman orientation parameter, maximum Raman orientation parameter M, minimum Raman orientation parameter m, and ratio M/m, which will be described later.

The average value v of Raman orientation parameter is preferably 3.0 or larger, more preferably 3.4 or larger or 3.7 or larger.

In cases when the average value v of Raman orientation parameter is 3.0 or larger, the composite porous hollow-fiber membrane has enhanced strength and is suitable for use in cross flow filtration.

The maximum Raman orientation parameter M and the minimum Raman orientation parameter m are thought to respectively indicate the degree of orientation of main oriented portions in the columnar textures and the degree of orientation of portions which are served as points of effort in the drawing.

It is hence desirable to regulate the M and m so as to be in appropriate ranges, while taking account of a balance among performances of the composite porous hollow-fiber membrane to be obtained, such as strength, elongation, and water permeability.

The larger the value of M/m, the higher the tendency that the orientation of molecular chains has proceeded to heighten the strength of the composite porous hollow-fiber membrane. Such composite porous hollow-fiber membrane having a large value of M/m is preferred for use in cross flow filtration operations. Consequently, M/m in the present invention is preferably 3 or larger, more preferably 4 or larger, even more preferably 5 or larger.

The degree of orientation π determined by wide-angle X-ray diffractometry indicates the orientation of molecular chains of the entire composite porous hollow-fiber membrane, while the average value v of Raman orientation parameter determined by Raman spectrometry tends to indicate the orientation of molecular chains for the case where attention is focused on the columnar textures of the composite porous hollow-fiber membrane. Namely, the average value v tends to indicate the local orientation of molecular chains.

In cases when both molecular chains in the entire composite porous hollow-fiber membrane and local molecular chains in the membrane have been highly oriented, this composite porous hollow-fiber membrane has enhanced strength. It is hence preferable that the degree of orientation π is in the range of 0.6 or larger but less than 1.0 and the average value v of Raman orientation parameter is 3.4 or larger. It is more preferable that the degree of orientation π is in the range of 0.7 or larger but less than 1.0 and the average value v of Raman orientation parameter is 3.7 or larger.

(B) Second Layer

The second layer has a three-dimensional network texture. The term "second layer" in the present invention means a portion in which a three-dimensional network texture is observed in a photograph of a longitudinal section of the fluororesin-based polymer separation membrane, the photograph being taken with a scanning electron microscope at a magnification of 60,000 times.

Figure 5:
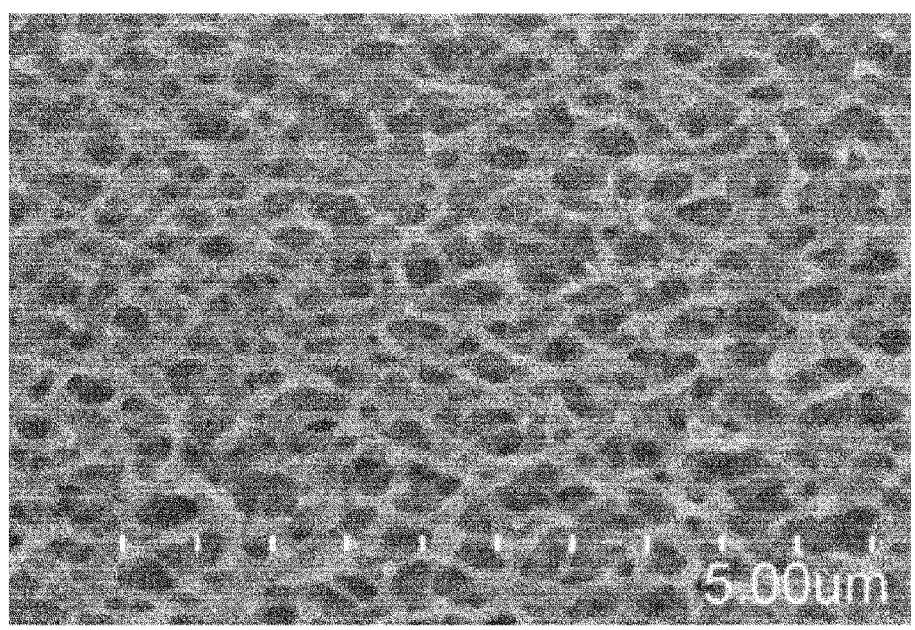
FIG. 5 is a diagram showing a photograph of a cross-section of a second layer having a three-dimensional network texture according to the present invention.

The three-dimensional network texture is a texture including a solid matter which reticulately spreads three-dimensionally as shown in FIG. 5. The three-dimensional network texture has pores and voids separated by the solid matter constituting the reticulation.

Owing to the three-dimensional network texture, the second layer in the composite porous hollow-fiber membrane substantially has separation performance, i.e., the ability to remove a target substance from a liquid to be filtrated.

The surface of the second layer has an average pore diameter of 5.0 nm to 5.0 µm.

Since the surface of the second layer has an average pore diameter of 5.0 µm or less, microorganisms can be separated. In cases when the average pore diameter of the surface of the second layer is 2.0 µm or less, or 1.0 µm or less, the ability to remove microorganisms is enhanced.

Meanwhile, since the average pore diameter of the surface of the second layer is 5.0 nm or larger, the water permeability of the composite porous hollow-fiber membrane can be ensured. The average surface-pore diameter of the second layer may be 10 nm or larger.

Furthermore, in cases when the average pore diameter of the surface of the second layer is 0.2 µm or larger, 0.3 µm or larger, or 0.4 µm or larger, this second layer can allow useful ingredients such as, for example, flavor ingredients to pass therethrough in the fermentation industry and food industry; such average pore diameters are hence preferred. In cases when the average pore diameter of the surface of the second layer is 1.5 µm or less or 1.3 µm or less, clogging by enzymes can be inhibited. More specifically, it is preferable that the average pore diameter of the surface of the second layer is 0.4 µm to 1.0 µm.

Meanwhile, in the case of use in various water treatments including drinking water production, water purification treatment, and wastewater treatment, it is preferable that the average pore diameter of the surface of the second layer is 5.0 nm to 1.0 µm, from the standpoint that the membrane has excellent water permeability while preventing clogging substances from entering the pores of the membrane.

The average pore diameter of the surface of the second layer can be determined by photographing the surface of the second layer with a scanning electron microscope at a magnification of 60,000 times, measuring the diameter of each of ten or more arbitrarily selected pores, preferably twenty or more, and calculating a number-average of the measured diameters. In the case where the pores are not circular, the average pore diameter of the surface of the second layer is determined by a method in which circles (equivalent circles) which are equal in area to the pores are determined, for example, with an image analyzer and the diameters of the equivalent circles are taken as the diameters of the pores.

The term "surface of the second layer" has the following meaning. In the case where the second layer lies in the outermost surface of the composite porous hollow-fiber membrane, that term means the surface of the second layer which is exposed in the composite porous hollow-fiber membrane. In the case where the second layer is not exposed and lies between two layers, either of the two layers may be removed to expose the surface of the second layer.

It is preferable that the second layer has substantially no macrovoids. Thus, the reliability concerning prevention of the leakage of microorganisms, etc. can be heightened. Macrovoids are voids having a major-axis length which is at least ten times the surface-pore diameter. Macrovoids show substantially no filtration resistance to fluids to be permeated.

Whether there are macrovoids or not can be assessed by photographing the second layer within a radial-direction cross-section of the composite porous hollow-fiber membrane using a scanning electron microscope at a magnification of 3,000 times and measuring the major-axis lengths of voids in the photograph image. In the case where the voids have distorted shapes and the major-axis lengths thereof are difficult to determine, use may be made of a method in which circles (equivalent circles) equal in area to the voids are determined, for example, with an image analyzer and the diameters of the equivalent circles are taken as the major-axis lengths.

It is preferred to photograph at least thirty portions in order to ascertain the presence or absence of macrovoids.

With respect to the chemical composition (e.g., the content of a fluororesin-based polymer) of the three-dimensional network texture, the explanation given above regarding the columnar texture applies.

That is, the second layer includes a solid matter including a fluororesin-based polymer, and at least some of the solid matter constitutes the three-dimensional network texture. In the solid matter including a fluororesin-based polymer in the second layer, the proportion of that portion of the solid matter which constitutes the three-dimensional network texture is preferably 80% by weight or higher, more preferably 90% by weight or higher, even more preferably 95% by weight or higher.

It is preferable that a main structure in the second layer is the three-dimensional network texture. The proportion of the three-dimensional network texture in the second layer is preferably 80% by weight or higher, more preferably 90% by weight or higher, even more preferably 95% by weight or higher. The second layer may be constituted of the three-dimensional network texture only.

More specifically, it is preferable that the second layer includes, as a main structure thereof, the three-dimensional network texture including a fluororesin-based polymer as a main component.

1-3. Disposition of the Layers

It is preferable that in the composite porous hollow-fiber membrane, the second layer is disposed so as to be in contact with the liquid to be filtrated. In the case where the membrane is for use in external pressure type filtration, it is preferable that this membrane includes the second layer as an outermost layer since the outer surface thereof comes into contact with the liquid to be filtrated. It is preferable that the first layer is disposed in such a position that the first layer does not come into contact with the liquid to be filtrated.

In the membrane having such configuration, pore clogging can be inhibited by the second layer, which has the ability to remove microorganisms and the like. In addition, this membrane can have high strength due to the columnar texture of the first layer. As a result, this membrane renders stable filtration possible even in external-pressure filtration, in which especially high force is imposed thereon.

1-4. Layer Thicknesses

It is preferable that the first layer is the thickest among the layers possessed by the composite porous hollow-fiber membrane. Thus, the composite porous hollow-fiber membrane can have high strength.

The ratio of the thickness of the first layer to the overall thickness of the composite porous hollow-fiber membrane is preferably 0.50 or higher, 0.55 or higher, or 0.60 or higher. The composite porous hollow-fiber membrane may include a plurality of first layers. In the case where the composite porous hollow-fiber membrane includes a plurality of first layers, it is only required that the total thickness of the first layers be in that numerical range.

From the standpoint of a balance between water permeability and physical strength, the thickness of the first layer is preferably 100 μm to 500 μm, more preferably 150 μm to 300 μm.

The second layer has a network texture which three-dimensionally spreads not only in the circumferential direction of the membrane but also in the thickness direction of the membrane. The second layer can hence be considered to include a plurality of thin "nets" superposed in the thickness direction. The thin "nets" are referred to as "thin layers" below.

The microorganism-removing ability of the second layer is the sum of the microorganism-removing ability of the individual thin layers of the second layer. Namely, by increasing the number of thin layers, the microorganism-removing ability is improved. The thickness of the second layer may be changed in accordance with the conditions of a liquid to be filtrated, such as the concentration of a substance to be removed, the conditions for filtration operation, the conditions of a permeate to be required, etc. For example, the thickness of the second layer is preferably 10 μm to 120 μm, more preferably 15 μm to 80 μm. It is preferable that the thickness of the second layer is at least two times, at least five times, or at least ten times, the average surface-pore diameter of the second layer.

From the standpoint of ensuring removing ability and water permeability, the ratio of the thickness of the second layer to the overall thickness of the composite porous hollow-fiber membrane is preferably 0.03-0.35.

The composite porous hollow-fiber membrane of the present invention has a multilayer structure including a layer having the columnar texture described above and a layer having the three-dimensional network texture. However, in case where the thickness of the second layer, which has the three-dimensional network texture, is too large as compared with the thickness of the first layer, which has the columnar texture, the composite porous hollow-fiber membrane has reduced physical strength. Meanwhile, in case where the thickness of the second layer, which has the three-dimensional network texture, is too small, there is a concern that a substance to be removed might leak out if the second layer has defects or the like. Consequently, the ratio of the average thickness of the second layer to the average thickness of the first layer is preferably 0.04-0.5, more preferably 0.07-0.4.

In the case where the first layer and the second layer are in contact with each other, the interface therebetween may have a structure in which the two layers have intruded into each other.

In measuring the layer thicknesses, one-half the thickness of the structure where the two layers have intruded into each other is included in the thickness of the first layer and in the thickness of the second layer.

1-5. Others

It is preferable that the composite porous hollow-fiber membrane of the present invention has a pure-water permeation performance at 50 kPa and 25° C. of 0.1 $m^3/m^2/hr$ or higher and a breaking strength of 25 MPa or higher. More preferably, the pure-water permeation performance at 50 kPa and 25° C. is 0.2 $m^3/m^2/hr$ or higher and the breaking strength is 30 MPa or higher. Especially from the standpoint of rendering the composite porous hollow-fiber membrane usable as a high-performance membrane having both high pure-water permeation performance and high strength performance, it is preferable that the pure-water permeation performance at 50 kPa and 25° C. is in the range of 0.2-5.0 $m^3/m^2/hr$ and the breaking strength is in the range of 25 MPa to 70 MPa. More preferably, the pure-water permeation performance at 50 kPa and 25° C. is in the range of 0.2-5.0 $m^3/m^2/hr$ and the breaking strength is in the range of 30 MPa to 70 MPa.

An examination for determining the pure-water permeation performance is conducted using a miniature module having a length of 200 mm produced using four composite porous hollow-fiber membranes. External-pressure dead end filtration of reverse osmosis membrane filtrate is conducted for 10 minutes under the conditions of a temperature of 25° C. and a filtration pressure difference of 16 kPa to determine the permeate amount ($m^3$). This permeate amount ($m^3$) is converted to a value per unit time (h) and unit effective membrane area ($m^2$), and this value is converted to a value for a pressure of 50 kPa by multiplying said value by 50/16, thereby determining the pure-water permeation performance.

Methods for determining the breaking strength and the elongation at break are not particularly limited. For example, the strength and the elongation can be determined in the following manner. A tensile test in which a tensile tester is used to examine a sample having a measurement length of 50 mm at a tensile speed of 50 mm/min is performed five or more times using different samples, and an average value of the breaking strengths and an average value of the elongations at break are determined.

The composite porous hollow-fiber membrane may include layers other than the first layer and the second layer.

The composite porous hollow-fiber membrane may have dimensions including, for example, an outer diameter of about 1.5 mm and an inner diameter of about 0.8 mm. The dimensions can be varied in accordance with the intended use, etc.

The composite porous hollow-fiber membrane explained above has pure-water permeation performance, strength, and elongation which suffice for use in the fermentation industry, food industry, drinking water production, and industrial water production and for various water treatments such as water purification treatment, wastewater treatment, and seawater desalination.

2. Processes for Producing the Composite Porous Hollow-Fiber Membrane

Embodiments of the process described above for producing the composite porous hollow-fiber membrane are described below.

A first example of the production process is a method in which a solution of a fluororesin-based polymer is applied to the outer or inner surface of a first layer and the solution applied is then coagulated in a coagulating bath, thereby coating the first layer with a second layer.

A second example is a method in which a fluororesin-based-polymer solution for second-layer formation and a fluororesin-based-polymer solution for first-layer formation are simultaneously ejected through a spinneret and are coagulated and cooled/solidified in a coagulating bath, thereby simultaneously forming a second layer and a first layer.

The first method has an advantage in that the operations can be separately controlled and, hence, the performances of the membrane to be obtained are easy to control. The second method has an advantage in that since the operations can be simultaneously performed, the size of the production apparatus can be minimized. The first method is explained below.

That is, a process according to this embodiment for producing a composite porous hollow-fiber membrane includes the following steps 1) to 3).

1) A step in which a porous hollow fiber having a columnar texture oriented in a longitudinal direction and having a thickness uniformity of 0.60 or higher but less than 1.00 is formed, by thermally induced phase separation, from a membrane-forming raw liquid containing a fluororesin-based polymer.

2) A step in which the porous hollow fiber obtained in the step 1) is drawn in the longitudinal direction 2.0-5.0 time.

3) A step in which a layer having a three-dimensional network texture is formed on the porous hollow fiber obtained in the step 2), by nonsolvent-induced phase separation from a membrane-forming raw liquid containing a fluororesin-bases polymer.

The steps are explained below.

2-1. Step for forming Columnar Texture

First, the step 1) above is explained.

This step specifically includes the following steps:

(A) preparation of membrane-forming raw liquid; and (B) formation of porous hollow fiber having columnar texture.

(A) Preparation of Membrane-Forming Raw Liquid

In this step, a fluororesin-based polymer is dissolved in a poor solvent or good solvent therefor at a relatively high temperature not lower than the crystallization temperature, thereby preparing a fluororesin-based-polymer solution (i.e., a membrane-forming raw liquid containing the fluororesin-based polymer).

In cases when the polymer concentration in the membrane-forming raw liquid is high, a composite porous hollow-fiber membrane having high strength is obtained therefrom. Meanwhile, in cases when the polymer concentration therein is low, the resultant composite porous hollow-fiber membrane has an increased porosity and improved pure-water permeation performance. Consequently, the concentration of the fluororesin-based polymer is preferably 20-60% by weight, more preferably 30-50% by weight.

In this description, the term "poor solvent" means a solvent in which the fluororesin-based polymer is unable to be dissolved in an amount of 5% by weight or larger in a low-temperature range up to 60° C. but is able to be dissolved in an amount of 5% by weight or larger in a high-temperature range of from 60° C. to the melting point of the fluororesin-based polymer (for example, about 178° C. in the case where the polymer is constituted of a vinylidene fluoride homopolymer alone).

The term "good solvent" is defined as a solvent in which the fluororesin-based polymer can be dissolved in an amount of 5% by weight or larger even in a low-temperature range up to 60° C. The term "nonsolvent" is defined as a solvent in which the fluororesin-based polymer neither dissolves nor swells at temperatures up to the melting point of the fluororesin-based polymer or to the boiling point of the solvent.

Examples of the poor solvent for the fluororesin-based polymer include cyclohexanone, isophorone, γ-butyrolactone, methyl isoamyl ketone, propylene carbonate, and dimethyl sulfoxide, and mixed solvents including these.

Examples of the good solvent include N-methyl-2-pyrrolidone, dimethylacetamide, dimethylformamide, methyl ethyl ketone, acetone, tetrahydrofuran, tetramethylurea, and trimethyl phosphate, and mixed solvents including these.

Examples of nonsolvents include: water; aliphatic hydrocarbons, aromatic hydrocarbons, aliphatic polyhydric alcohols, aromatic polyhydric alcohols, and chlorinated hydrocarbons, such as hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, and low-molecular-weight polyethylene glycol; other chlorinated organic liquids; and mixed solvents including these.

(B) Formation of Porous Hollow Fiber Having Columnar Texture

In the step of forming a porous hollow fiber, a thermally induced phase separation method in which phase separation is induced by a temperature change is utilized to obtain a porous hollow fiber from the membrane-forming raw liquid containing a fluororesin-based polymer. In order for the porous hollow fiber to be drawn in a high ratio of 2.0 time or higher as will be described later, the porous hollow fiber has a columnar texture oriented in the longitudinal direction thereof, the columnar texture preferably having a thickness uniformity of 0.60 or higher but less than 1.00. The lower limit of the thickness uniformity of the columnar texture is more preferably 0.70 or higher, even more preferably 0.80 or higher, especially preferably 0.90 or higher.

Two phase separation mechanisms are mainly utilized in thermally induced phase separation methods. One is a liquid-liquid phase separation method in which a polymer solution in which the polymer is in an evenly dissolved state at high temperatures is separated, during a temperature drop, into a polymer thick phase and a polymer thin phase due to a decrease in the dissolving ability of the solution and the structure is thereafter fixed by crystallization. The other is a solid-liquid phase separation method in which a polymer solution in which the polymer is in an evenly dissolved state at high temperatures undergoes crystallization of the polymer during a temperature drop and is thus separated into a polymer solid phase and a solvent phase.

A three-dimensional network texture is mainly formed in the former method, and a spherical texture is mainly formed in the latter method. In the production of the porous hollow fiber membrane of the present invention, it is preferred to utilize the latter phase separation mechanism. A polymer concentration and a solvent which induce the solid-liqu1id phase separation are hence selected. In the former phase separation mechanism, it is difficult to develop the above-described columnar texture oriented in the longitudinal direction of the porous hollow-fiber membrane. This is because the polymer thick phase forms a very fine phase in the phase separation before structure fixing and cannot be made columnar.

In a specific method for forming a porous hollow fiber having a columnar texture, a hollow portion-forming liquid is ejected through the inner orifice of a double tube-type spinneret for spinning a porous hollow-fiber membrane, while ejecting the above-described membrane-forming raw liquid through the outer orifice of the double tube-type spinneret. The thus-ejected membrane-forming raw liquid is cooled and solidified in a cooling bath to obtain a porous hollow fiber.

The fluororesin-based-polymer solution is, before ejection through the spinneret, placed under specific temperature conditions for a given time while being subjected to a pressure. The pressure is preferably 0.5 MPa or higher, more preferably 1.0 MPa or higher. The temperature T of the polymer solution preferably satisfies Tc+35° C.≤T≤Tc+60° C., more preferably satisfies Tc+40° C.≤T≤Tc+55° C. Tc is the crystallization temperature of the fluororesin-based-polymer solution. The time for which the polymer solution is held at the pressure and temperature is preferably 10 seconds or longer, more preferably 20 seconds or longer.

Specifically, a staying part for allowing the polymer solution to stay has been provided to any site in a solution sending line for delivering the polymer solution to the spinneret, and a pressurizing unit for applying a pressure to the staying polymer solution and a temperature-adjusting unit for adjusting the temperature of the staying polymer solution (for example, a heating unit) are provided. The pressurizing unit is not particularly limited, but by disposing two or more pumps in the solution sending line, a pressure can be applied at any site therebetween. Examples of the pumps include piston pumps, plunger pumps, diaphragm pumps, wing pumps, gear pumps, rotary pumps, and screw pumps. Two or more kinds of pumps may be used.

Since this step allows a pressure to be applied under the conditions favorable to crystallization, it is presumed that crystal growth has anisotropy and in turn, not an isotropic spherical texture but a texture oriented in the longitudinal direction of the porous hollow-fiber membrane is developed and, as a result, a columnar texture is obtained.

The crystallization temperature Tc of the fluororesin-based-polymer solution is defined as follows. Using an apparatus for differential scanning calorimetry (DSC measurement), a mixture having the same composition as the membrane-forming polymer raw liquid composition containing a fluororesin-based polymer, a solvent, etc. is enclosed in a sealable DSC container, heated to a dissolution temperature at a heating rate of 10° C./min, and held at that temperature for 30 minutes, thereby evenly dissolving the solid matter, and the contents are then cooled at a cooling rate of 10° C./min. A rise temperature for a crystallization peak observed during the cooling is the Tc.

The cooling bath for cooling the fluororesin-based-polymer solution ejected through the spinneret is described below. It is preferred to use, as the cooling bath, a mixed liquid including a poor or good solvent contained in a concentration of 50-95% by weight and a nonsolvent contained in a concentration of 5-50% by weight. It is preferable that this poor solvent is the same as the poor solvent used in the polymer solution. Meanwhile, as the hollow portion-forming liquid, it is preferred to use a mixed liquid including a poor or good solvent contained in a concentration of 50-95% by weight and a nonsolvent contained in a concentration of 5-50% by weight, like the cooling bath. It is preferable that this poor solvent is the same as the poor solvent used in the polymer solution.

Here, it is desirable to promote polymer uptake into and growth of constricted portions in order to obtain not a fibrous texture having a large number of constricted portions but a columnar texture having a uniform thickness. The present inventors conceived that the polymer uptake into and growth of constricted portions leads to disappearance of the constricted portions, which have high interface energy, and results in energetic stabilization, and that the polymer uptake into and growth of constricted portions can hence be made to occur preferentially to the growth of portions other than the constricted portions. The present inventors made intensive studies on methods for enhancing the thickness uniformity.

As a result, it has been found that a preferred method for promoting the polymer uptake into and growth of constricted portions is one in which the thermally induced phase separation includes at least one of the following cooling steps a) and b):

a) a step in which the membrane-forming raw liquid is immersed in a cooling bath having a temperature Tb which satisfies Tc−30° C.<Tb≤Tc; and b) a step in which the membrane-forming raw liquid is immersed in a cooling bath having a temperature Tb1 which satisfies Tb1≤Tc−30° C. and is then immersed in a cooling bath having a temperature Tb2 which satisfies Tc−30° C.<Tb2≤Tc (provided that Tc is a crystallization temperature of the membrane-forming raw liquid containing a fluororesin-based polymer).

It has been found that the cooling and solidification in the present invention can be caused to proceed gradually by employing the step a), in which cooling and solidification in the cooling bath is conducted at a temperature around the crystallization temperature of the polymer solution. In this case, the cooling bath is made to have a temperature Tb which satisfies Tc−30° C.<Tb≤Tc, where Tc is the crystallization temperature of the fluororesin-based-polymer solution. More preferably, the temperature Tb of the cooling bath satisfies Tc−20° C.<Tb≤Tc.

The passing time through the cooling bath (i.e., immersing time in the cooling bath) is not particularly limited so long as a time sufficient for completing the thermally induced phase separation, which includes polymer uptake into and growth of constricted portions, can be ensured. The passing time may be experimentally determined while taking account of the number of porous hollow-fiber membranes, spinning speed, bath ratio, cooling ability, etc.

However, from the standpoint of attaining the desired thickness uniformity, it is preferred to prolong the passing time as much as possible while regulating the temperature of the cooling bath so as to be within that range. For example, it is desirable that the passing time is 10 seconds or longer, preferably 20 seconds or longer, more preferably 30 seconds or longer.

In the step b), the cooling may be conducted in two or more stages. Specifically, the cooling step may include a step in which the ejected polymer solution is cooled with a first cooling bath for heightening the degree of supercooling to promote the formation and growth of crystal nuclei and a step in which the ejected polymer solution is thereafter cooled with a second cooling bath for promoting polymer uptake into and growth of constricted portions. The step of cooling with the second cooling bath utilizes a phenomenon in which the polymer uptake into and growth of constricted portions preferentially occurs mainly in the course of structure enlargement in the phase separation.

In this case, by making the temperature Tb1 of the first cooling bath, which is for cooling the fluororesin polymer solution ejected through the spinneret, satisfy Tb1≤Tc−30° C., the degree of supercooling can be heightened to promote the formation and growth of crystal nuclei. In addition, by adjusting the temperature Tb2 of the second cooling bath to a temperature around the crystallization temperature (specifically, the temperature Tb2 is made to satisfy Tc−30° C.<Tb2≤Tc, more preferably Tc−20° C.<Tb2≤Tc), the polymer uptake into and growth of constricted portions can be promoted. Tc is the crystallization temperature of the polymer solution.

The passing time through each cooling bath can be changed. For example, it is desirable that the passing time through the first cooling bath is 1-20 seconds, preferably 3-15 seconds, more preferably 5-10 seconds, and the passing time through the second cooling bath is 10 seconds or longer, preferably 20 seconds or longer, more preferably 30 seconds or longer.

In cases when a texture having a thickness uniformity less than 0.60 is referred to as "fibrous texture" in order to distinguish it from the columnar texture, then the hollow-fiber membrane disclosed in JP-A-2006-297383 (Patent Document 1) is one having a fibrous texture. Hollow-fiber membranes having such a fibrous texture are relatively excellent in terms of strength and pure-water permeation performance. The present inventors hence attempted to enhance the strength of this hollow-fiber membrane by drawing. However, it was impossible to uniformly draw the hollow-fiber membrane, which was found to be unable to be increased in strength.

In general, a porous membrane for use in water treatment has a large number of void portions for passing water therethrough. This porous membrane is extremely difficult to merely draw, because during drawing, breakage of the texture occurs from void portions as starting points and proceeds. Especially in the case where the porous hollow-fiber membrane has a phase-separation porous structure obtained by dry/wet spinning in which nonsolvent-induced phase separation or thermally induced phase separation is utilized, that tendency is remarkable because this porous membrane has a large number of fine pores therein and has a high porosity.

In the case of the porous membrane having a fibrous texture disclosed in Patent Document 1, it is thought that the stress generated by drawing was dispersed by the fibrous texture oriented in the longitudinal direction and this rendered the drawing possible although the draw ratio was as low as below 2.0 time. However, it is still impossible to evenly draw the porous membrane at a high draw ratio of 2.0 time or above. The present inventors diligently made investigations on any cause thereof. As a result, it has been discovered that the fibrous texture has many constricted portions and stress concentration in the constricted portions occurs during drawing and that the constricted portions hence are preferentially drawn undesirably, making it impossible to uniformly draw the entire fibrous texture and hence impossible to attain an increased draw ratio.

The present inventors have further found that in cases when a hollow fiber has a columnar texture having a uniform thickness, the entire columnar texture can be uniformly drawn. The present inventors have made it possible to perform drawing at a high ratio of 2.0 time or above. The present inventors have succeeded in drawing and orienting molecular chains of the fluororesin-based polymer in the longitudinal direction of the porous hollow-fiber membrane by such uniform high-ratio drawing. Thus, the present inventors have succeeded in attaining strength enhancement while maintaining the high pure-water permeation performance.

2-2. Drawing

The porous hollow fiber obtained in 1) above is then subjected to a step in which the porous hollow fiber is drawn in the longitudinal direction at a draw ratio of 2.0-5.0 time, thereby orienting molecular chains of the polymer in the longitudinal direction of the porous hollow-fiber membrane. Thus, a first layer is formed.

The draw ratio is 2.0-5.0 time, more preferably 2.5-4.0 time, especially preferably 2.5-3.5 times. In case where the draw ratio is less than 2.0 time, the orientation of molecular chains by the drawing is insufficient. In case where the draw ratio exceeds 5.0 time, too large a decrease in elongation results.

The drawing temperature is preferably 60-140° C., more preferably 70-120° C., even more preferably 80-100° C. In cases when the drawing temperature is 60° C. or higher, the porous hollow fiber can be stably and homogeneously drawn. In cases when the drawing temperature is 140° C. or lower, the fluororesin-based polymer can be drawn and oriented while being inhibited from melting.

Drawing in a liquid is preferred because temperature control is easy, but drawing may be performed in a gas such as steam. Water is preferred as the liquid because of the easiness. In the case of drawing at about 90° C. or higher, a low-molecular-weight polyethylene glycol or the like can also be advantageously used.

2-3. Formation of Layer Having Three-Dimensional Network Texture

The step of forming a layer having a three-dimensional network texture, i.e., the step of forming a second layer, is explained below. This step specifically includes the following steps:

(A) preparation of membrane-forming raw liquid;

(B) application of the membrane-forming raw liquid to the drawn porous hollow fiber; and (C) formation of layer having three-dimensional network texture by nonsolvent-induced phase separation.

(A) Preparation of Membrane-Forming Raw Liquid

A membrane-forming raw liquid, i.e., a fluororesin-based-polymer solution, is prepared in this step. Specifically, it is preferable that a solvent, a fluororesin-based polymer, and additives are mixed together and the mixture is heated for several hours with stirring at a temperature lower than the boiling point of the solvent, so as to result in a transparent solution.

The polymer concentration in the membrane-forming raw liquid, i.e., the concentration of the sum of the fluororesin-based polymer and any other polymeric ingredient(s), is preferably 10-30% by weight, more preferably 12-25% by weight. In cases when the polymer concentration is 10% by weight or higher, it is possible to obtain a second layer having both preferred physical strength required for separation membranes and a pore diameter which is preferable for removing microorganisms. Meanwhile, in cases when the polymer concentration is 30% by weight or less, it is possible to obtain a three-dimensional network texture having preferred water permeability required for separation membranes.

It is preferable that the solvent includes at least 50% by weight any of the aforementioned good solvents for the fluororesin-based polymer. The solvent may contain a poor solvent for the fluororesin-based polymer in an amount up to 50% by weight.

It is preferable that the membrane-forming raw liquid contains an additive for controlling the pore diameter. An additive for controlling the pore diameter is incorporated into the fluororesin-based-polymer solution and this additive is dissolved away during the formation of a three-dimensional network texture or after the formation of the three-dimensional network texture. Thus, the average pore diameter of the surface can be controlled.

Examples of the additive include organic compounds and inorganic compounds.

Preferred for use as the organic compounds are ones which dissolve in both the solvent used in the polymer solution and the nonsolvent for causing nonsolvent-induced phase separation. Examples thereof include water-soluble polymers such as polyvinylpyrrolidone, polyethylene glycol, cellulose acetate, polyethylenimine, poly(acrylic acid), and dextran, surfactants, glycerin, and saccharides.

Preferred as the inorganic compounds are ones which dissolve in both the solvent used in the polymer solution and the nonsolvent for causing nonsolvent-induced phase separation. Examples thereof include calcium chloride, magnesium chloride, lithium chloride, and barium sulfate.

Also effective for controlling the rate of phase separation is to add a nonsolvent to the polymer solution. Examples of the nonsolvent to be added include water, methanol, ethanol, isopropyl alcohol, ethylene glycol, 2-methoxyethanol, glycerin, acetone, methyl ethyl ketone, N-methyl-2-pyrrolidone, dimethylformamide, dimethylacetamide, dimethyl sulfoxide, and dioxane.

(B) Application of the Membrane-Forming Raw Liquid to Porous Hollow Fiber

The membrane-forming raw liquid is applied to the surface of the drawn porous hollow fiber obtained by the method described above, i.e., to the surface of the first layer. Examples of the "application" include immersing the porous hollow fiber in the membrane-forming raw liquid or dropping the membrane-forming raw liquid onto the porous hollow fiber.

Preferred methods for controlling the application amount of the fluororesin-based-polymer solution include:

a method in which the application amount itself of the polymer solution is controlled;

a method in which the fluororesin-based-polymer separation membrane including a columnar texture is immersed in the polymer solution; and a method in which the polymer solution is applied to the fluororesin-based-polymer separation membrane including a columnar texture and some of the polymer solution is thereafter scraped off or blown off with an air knife.

(C) Formation of Layer Having Three-Dimensional Network Texture by Nonsolvent-Induced Phase Separation In this step, the porous hollow fiber to which the membrane-forming raw liquid has been applied is immersed in a coagulating bath to thereby cause nonsolvent-induced phase separation and form a second layer having a three-dimensional network texture.

The coagulating bath may be any bath which includes at least a nonsolvent for the fluororesin-based polymer. The content of the nonsolvent in the coagulating bath is preferably 40-95% by weight.

It is preferable that the coagulating bath contains a good solvent for the fluororesin-based polymer.

The coagulating bath containing a good solvent for the fluororesin-based polymer preferably is one in which the good solvent for the fluororesin-based polymer is contained in an amount of 5-60% by weight, or in an amount of 20-50% by weight. By regulating the content of the good solvent in the coagulating bath so as to be within that range, the rate at which the nonsolvent penetrates into the fluororesin-based-polymer solution is reduced, making it easy to form a three-dimensional network texture containing substantially no macrovoids. In cases when the content of the good solvent is 5% by weight or higher, the rate of nonsolvent penetration can be reduced, making it easy to inhibit the formation of macrovoids. Meanwhile, in cases when the content of the good solvent is 60% by weight or less, the fluororesin can be solidified in a relatively short time. As the good solvent for the fluororesin-based polymer, any of the good solvents shown above can be advantageously used.

3. Composite Porous Hollow-Fiber Membrane Module

Figure 6:
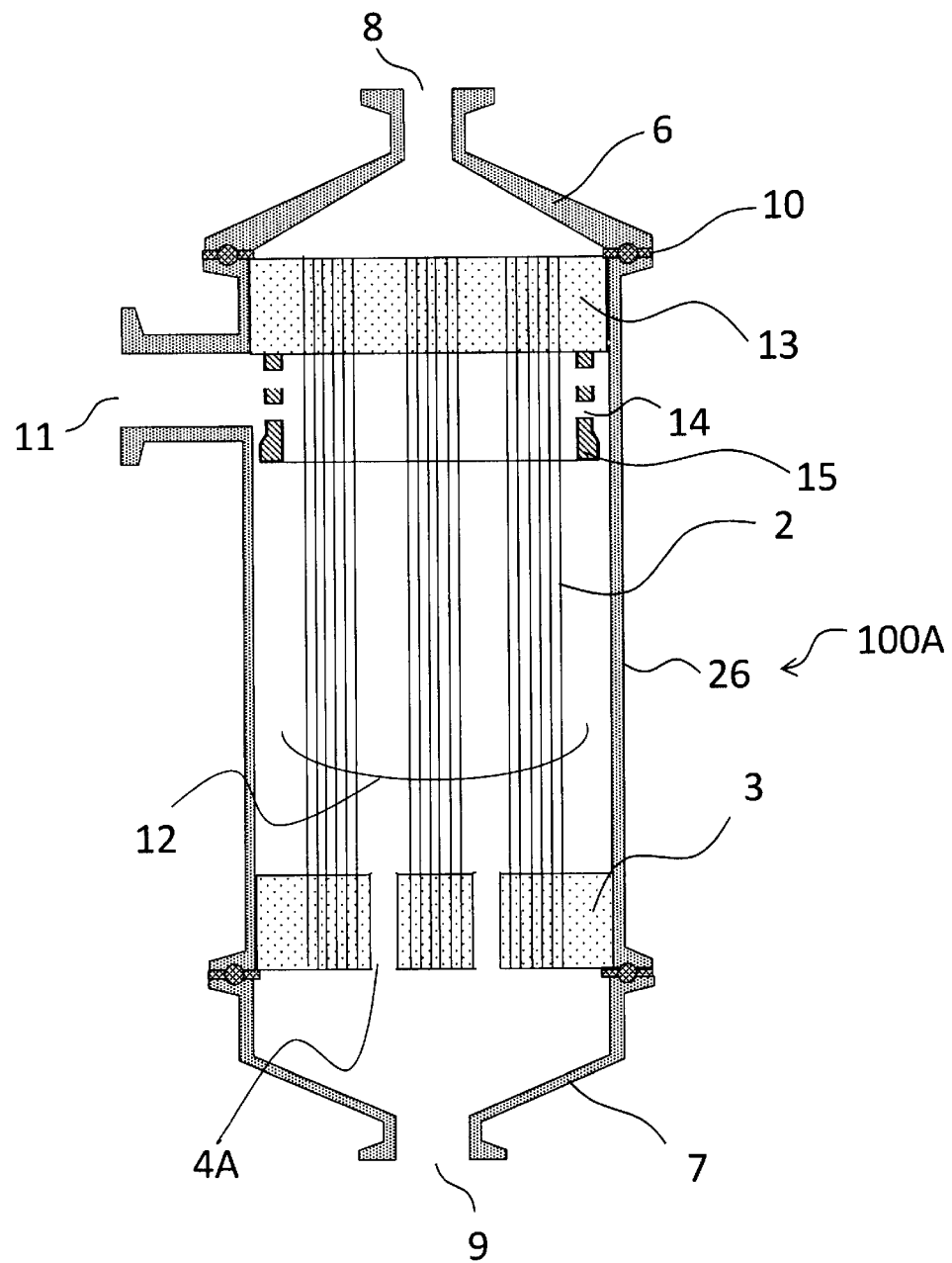
FIG. 6 is a diagram showing a composite porous hollow-fiber membrane module 100A according to the present invention.

The composite porous hollow-fiber membrane described above can be used as a member for a module. FIG. 6 shows an example of module configurations. In the following explanation, the terms "upper" and "lower" respectively mean the upper side and lower side within the drawing. The direction from the "lower" side toward the "upper" side is referred to as "height direction" for convenience.

FIG. 6 is a diagrammatic vertical sectional view of a composite porous hollow-fiber membrane module 100A according to an embodiment of the present invention.

The composite porous hollow-fiber membrane module 100A includes: a tubular case 1 having, in a height direction, a first end 1a and a second end 1b; a composite porous hollow-fiber membrane bundle 12 disposed in the tubular case 1 and including a plurality of composite porous hollow-fiber membranes 2 in which the ends (first ends) lying on the first end 1a side are closed and the ends (second ends) lying on the second end 1b side are opened; a first binding part 3 where the ends of the composite porous hollow-fiber membranes 2 lying on the first end 1a side are bound; and first flow channels 4 for leading a fluid so that the fluid passes through the first binding part 3 from the first end 1a side toward the second end 1b side.

The tubular case 1 includes a hollow tubular case body 26, an upper cap 6, and a lower cap 7. As FIG. 6 shows, the upper cap 6, which has a filtrate outlet 8, has been liquid-tightly and airtightly connected to an upper part of the tubular case body 26, and the lower cap 7, which has an inlet 9 for liquid to be filtrated, has been liquid-tightly and airtightly connected to a lower part of the tubular case body 26.

The upper cap 6 and the lower cap 7 are fixed to the tubular case body 26, for example, using gaskets 10, as shown in FIG. 6, and clamps or the like. An outlet 11 for liquid to be filtrated has been provided, as a nozzle for discharging a fluid (liquid to be filtrated), to the sidewall in a position near to the filtrate outlet 8 of the tubular case 1, i.e., in a position near to the second end 1b. The upper cap 6 has an inner diameter approximately equal to the inner diameter of the tubular case body 26, and the diameter thereof decreases toward the upper end thereof to form the filtrate outlet 8.

The lower cap 7 has an inner diameter approximately equal to the inner diameter of the tubular case body 26, and the diameter thereof decreases toward the lower end thereof to form the inlet 9 for liquid to be filtrated. The composite porous hollow-fiber membrane module 100A further includes: a composite porous hollow-fiber membrane bundle 12, which includes a plurality of composite porous hollow-fiber membranes 2; and binding parts where the composite porous hollow-fiber membranes 2 are bound together at the ends of the composite porous hollow-fiber membrane bundle 12. The binding parts include: a first binding part 3, provided to a portion of the tubular case body 26 which is on the side near to the inlet 9 for liquid to be filtrated; and a second binding part 13, provided to a portion of the tubular case body 26 which is on the side near to the filtrate outlet 8.

The composite porous hollow-fiber membrane module 100A further includes a flow regulation tube 15 which has a plurality of flow regulation holes 14 in the sidewall thereof and which has been disposed between the tubular case 1 and the composite porous hollow-fiber membrane bundle 12 so that the flow regulation tube 15 lies side by side with the outlet 11 for liquid to be filtrated, in a radial direction of the tubular case 1. The second binding part 13 has been disposed in the flow regulation tube 15.

Binding methods for the composite porous hollow-fiber membrane bundle 12 in the first binding part 3 are not particularly limited so long as the binding part satisfies mechanical strength, chemical durability, thermal durability, etc. Examples thereof include: a method in which the periphery of a composite porous hollow-fiber membrane bundle 12 is covered with a heat-shrinkable tube or the like and the covering material is heated to bind the hollow-fiber membranes; a method in which composite porous hollow-fiber membranes are arranged in parallel on a sheet and are then rolled in the sheet and bound; and a method in which composite porous hollow-fiber membranes are bonded with a potting material. The potting material can include a silicone resin, epoxy resin, polyurethane resin, or the like as a main component. The potting material may contain additives other than adhesives, such as silica, glass, or rubber.

The first binding part 3 has first flow channels 4 serving as flow channels for fluids, e.g., a liquid to be filtrated. Specifically, the first flow channels 4 include through holes 4A formed in the first binding part 3. The through holes 4A may have been disposed in any positions, such as, for example, at the vertexes of many equilateral triangles, at the intersections of radial lines and concentric circles, or at the intersections on a lattice. It is, however, preferred to arrange the through holes 4A so that the distances between adjacent through holes are substantially the same, because in case where said distances are uneven, staying is prone to occur around through holes disposed at a larger distance therebetween than the others. The shape of cross-sections of the through holes 4A which are perpendicular to the height direction is not limited, and may be, for example, circular, elliptic, polygonal, or star-shaped.

The composite porous hollow-fiber membrane module 100A can be used after having been subjected to steam sterilization or hot-water sterilization. However, some kinds of composite porous hollow-fiber membranes 2 suffer shrinkage due to steam sterilization or hot-water sterilization. There is hence a possibility that steam sterilization or hot-water sterilization performed after module fabrication might result in shrinkage of the composite porous hollow-fiber membranes 2 and this might cause damage to the composite porous hollow-fiber membranes 2 or detach the composite porous hollow-fiber membranes 2 from the binding part. It is therefore desirable to subject the composite porous hollow-fiber membranes 2 beforehand to a steam treatment or hot-water treatment to shrink the membranes 2, before the ends of the membranes are bound to fabricate a module.

In general, steam sterilization is conducted at 121° C. or higher. It is hence desirable to perform a pretreatment with steam having a temperature of 121° C. or higher. Meanwhile, hot-water sterilization is generally conducted at about 80° C., but there are often cases where the temperature is changed in accordance with steps. It is hence desirable to treat the composite porous hollow-fiber membranes 2 beforehand with hot water having a temperature not lower than a supposed use temperature.

In a cross-section of the composite porous hollow-fiber membrane module 100A which is perpendicular to the height direction, the total area of the composite porous hollow-fiber membranes 2 and the hollows of the composite porous hollow-fiber membranes 2 is preferably 35-65% of the area of the end face of the first binding part 3 which is on the side near to the second end 1b. In case where the total area thereof is too small, the composite porous hollow-fiber membrane module 100A has a reduced filtration throughput per unit volume, resulting in an increase in cost per unit filtration rate. In case where the total area thereof is too large, flow channel clogging due to microorganisms, etc. is prone to occur.

It is preferable that the composite porous hollow-fiber membrane bundle 12 is housed in a loose state in the tubular case 1, with the both-end binding parts 3 and 13 interposed therebetween, from the standpoints of the efficiency of fabricating the composite porous hollow-fiber membrane module 100A and the cleanability of the composite porous hollow-fiber membranes 2 in module cleaning. The expression "in a loose state" means that the length of that portion of the composite porous hollow-fiber membranes 2 which ranges from the end face of the first binding part 3 that is on the side near to the second end 1b to the end face of the second binding part 13 that is on the side near to the first end 1a is larger than the linear distance from said end face of the first binding part 3 to said end face of the second binding part 13.

The second binding part 13, which lies in an upper-end portion of the composite porous hollow-fiber membrane module 10A, has been disposed in a portion of the tubular case body 26 which is near to the second end 1b. The second binding part 13 has been configured by binding the composite porous hollow-fiber membrane bundle 12, which includes a large number of composite porous hollow-fiber membranes 2. The hollows of the composite porous hollow-fiber membranes 2 in the second binding part 13 remain unfilled and are opened, and a filtrate is taken out through the openings toward the upper cap 6. Binding methods and usable materials are not particularly limited so long as the binding part satisfies mechanical strength, chemical durability, thermal durability, etc. For example, the same methods and materials as for the first binding part 3 can be selected.

This module 100A has a configuration in which the outer diameter of the second binding part 13 is smaller than the inner diameter of the tubular case body 26. A flow regulation tube 15 lies between the tubular case 1 and the second binding part, and the second binding part 13 has been fixed to the tubular case 1 or the flow regulation tube 15. The flow regulation tube 15 has been fixed to the tubular case. Methods used for fixing these members have no relation to the present invention.

The material of the tubular case 1 to be used in the composite porous hollow-fiber membrane module 100A is not particularly limited so long as the tubular case 1 satisfies mechanical strength, chemical durability, thermal durability, etc. Examples thereof include vinyl chloride resins, polypropylene resins, polysulfone resins, fluororesins such as polytetrafluoroethylene and perfluoroalkoxyfluororesins, polycarbonates, polypropylene, polymethylpentene, poly (phenylene sulfide), polyetherketones, stainless steel, and aluminum. The material of the flow regulation tube 15 to be used in the composite porous hollow-fiber membrane module 100A is not particularly limited, and can be selected, for example, from the same materials for the tubular case 1.

The flow regulation tube 15 is disposed in the tubular case 1, which has, in height direction thereof, the first and second ends as shown in the drawing. In this composite porous hollow-fiber membrane module 10A, the tubular case 1 is equipped with a fluid inflow/outflow port located in the sidewall further toward the second-end side than the center of the tubular case 1 and with a fluid inflow/outflow port located in a first-end-side end face of the tubular case, and the hollows of the composite porous hollow-fiber membranes are opened on the second-end side and closed on the first-end side. Due to this configuration, clogging by microbial fermentation liquids, etc. is less apt to occur.

4. Methods for Operating the Composite Porous Hollow-Fiber Membrane Module

In the following explanation, a liquid to be filtrated is supplied to a lower portion of the module and a filtrate flows out from an upper portion of the module. The upside/downside direction of the composite porous hollow-fiber membrane module in the use position is the same as the upside/downside direction of the module shown in the drawing.

In a filtration operation using the composite porous hollow-fiber membrane module 100A, a liquid to be filtrated enters through the inlet 9 for liquid to be filtrated, passes upward through the first flow channels 4 from the first end 1a of the first binding part 3, and flows out. The liquid being filtrated, after passing through the inside of the composite porous hollow-fiber membranes 2, moves, as a filtrate, to the space surrounded by the second binding part 13 and the upper cap 6. Thereafter, the filtrate is taken out from the module through the filtrate outlet 8. In the case of performing dead end filtration, the outlet 11 for liquid to be filtrated is closed.

Meanwhile, in the case of performing cross flow filtration, some of the liquid to be filtrated, which has been introduced into the tubular case 1, is taken out through the outlet 11 for liquid to be filtrated. The thus taken-out liquid to be filtrated is introduced again into the module through the inlet 9 for liquid to be filtrated. The cross flow filtration causes a flow in the module and hence produces the effect of cleaning the membrane surface by the flow near the membrane surface, thereby reducing the accumulation of suspended matter contained in microorganism culture solutions. By heightening the membrane-surface linear velocity in the cross flow filtration operation, higher shear force can be given to the suspended matter or the like adhered to the membrane surface. In this case, the composite porous hollow-fiber membranes are supported by the above-described columnar texture disposed in an inner-circumference-side portion of each membrane, and can retain the separation function without being broken.

Namely, the accumulation of suspended matter is reduced by a method of operating the composite porous hollow-fiber membrane module in which the following step (A) and step (B) are simultaneously performed:

(A) a step in which a liquid to be filtrated is introduced into the tubular case through the fluid inflow/outflow port located in the first-end-side end face, and the liquid to be filtrated is discharged from the tubular case through the fluid inflow/outflow port located in the sidewall on the second-end side; and (B) a step in which a filtrate is taken out from the hollows of the composite porous hollow-fiber membranes toward the second end.

The cross flow filtration may be performed in such a manner that a liquid to be filtrated is introduced through the outlet 11 for liquid to be filtrated and is taken out through the inlet 9 for liquid to be filtrated. Namely, the accumulation of suspended matter is reduced by a method of operating the composite porous hollow-fiber membrane module in which the following step (B) and step (C) are simultaneously performed.

(B) A step in which a filtrate is taken out from the hollows of the composite porous hollow-fiber membranes toward the second end.

(C) A step in which a liquid to be filtrated is introduced into the tubular case through the fluid inflow/outflow port located in the sidewall on the second-end side, and the liquid to be filtrated is discharged from the tubular case through the fluid inflow/outflow port located in the first-end side end face.

The membrane-surface linear velocity in the cross flow filtration is preferably 0.1-7 m/s. By giving shear force at a membrane-surface linear velocity of 0.1 m/s or higher, the flow channel clogging by microorganism culture solutions can be inhibited. Membrane-surface linear velocities of 7 m/s or less can reduce the cost of electric power for circulating the microorganism culture solution and can reduce the stress caused by shear application to the microorganisms. The membrane-surface linear velocity is more preferably 0.3-3 m/s. Thus, a higher clogging-inhibitive effect can be attained simultaneously with profitability and stable growth of the microorganisms.

After a filtration operation is performed for a certain time period using the composite porous hollow-fiber membrane module 100A, a step for cleaning the inside of the module is conducted. Water, a liquid chemical, a gas, etc. are supplied through the inlet 9 for liquid to be filtrated. In particular, for a step which necessitates hot-water sterilization, hot water having a temperature of about 80° C. or higher is supplied.

The cleaning in which a gas is supplied is, in particular, called air scrubbing. Namely, the accumulation of suspended matter can be inhibited by a method of operating the composite porous hollow-fiber membrane module in which the following step (E) is conducted:

(E) a step in which a gas is introduced into the tubular case through the fluid inflow/outflow port located in the first-end-side end face, and the gas is discharged from the tubular case through the fluid inflow/outflow port located in the sidewall on the second-end side.

Meanwhile, there are cases where a cleaning step is conducted by a method in which a filtrate, water, or a cleaning liquid is introduced through the filtrate outlet 8 and discharged outward from the hollows of the composite porous hollow-fiber membranes 2. This cleaning method is called "back-pressure washing" or simply called "backwashing". Namely, the accumulation of suspended matter can be inhibited by a method of operating the composite porous hollow-fiber membrane module in which the step (B) and the following step (D) are repeatedly conducted:

(D) a step in which, after the step (B), a fluid is filtrated by passing the fluid from the hollows of the composite porous hollow-fiber membranes on the second-end side to the outside of the composite porous hollow-fiber membranes.

In the case where the inside of the module is subjected, for example, to steam sterilization, wastewater flows downward through the first flow channels 4 and is discharged from the module through the inlet 9 for liquid to be filtrated. In this operation, since a fluid inlet has been disposed in the first-end-side end face, the suspended matter in the module can be effectively discharged to inhibit flow channel clogging due to microorganism culture solutions.

In cases when the cross flow filtration, air scrubbing, and backwashing, which are operations for inhibiting the membrane surface and flow channels from being clogged, are used in combination, the clogging can be more efficiently inhibited. Namely, the accumulation of suspended matter can be effectively inhibited by a method of operating the composite porous hollow-fiber membrane module in which the step (B) and the step (D) are repeatedly conducted and the following step (E) is further conducted:

(E) a step in which a gas is introduced into the tubular case through the fluid inflow/outflow port located in the first-end-side end face and the gas is discharged from the tubular case through the fluid inflow/outflow port located in the sidewall on the second-end side.

The present invention is not limited to the embodiments described above and may be suitably modified or improved at will. The material, shape, dimensions, numerical values, form, number, location, etc. of each of the constituent elements of the embodiments described above are not limited so long as the present invention can be achieved.

EXAMPLES

The present invention is described below by referring to specific Examples, but the present invention is not limited by these Examples in any way. Incidentally, physical property values relating to the present invention can be determined by the following methods.

(1) Pure-Water Permeation Performance

A compact module including four composite porous hollow-fiber membranes and having an effective length of 200 mm was fabricated. Distilled water was delivered to the module over 1 hour under the conditions of a temperature of 25° C. and a filtration pressure difference of 16 kPa, and the amount (m$^3$) of the obtained permeate was measured, converted into a value per unit time (h) and unit membrane area (m$^2$), further converted in terms of pressure (50 kPa), and used as the pure-water permeation performance (m$^3$/m$^2$/h). The unit membrane area was calculated from the average outer diameter and effective length of the composite porous hollow-fiber membranes.

(2) Breaking Strength and Elongation at Break

Using a tensile tester (TENSILON (registered trademark)/RTM-100, manufactured by Toyo Baldwin Co., Ltd.), a sample having a measurement length of 50 mm was examined at a tensile speed of 50 mm/min. This test was conducted five or more times while changing samples. Average values of breaking strength and elongation at break were calculated.

(3) Degree of Orientation π of Molecular Chains in Longitudinal Direction of Composite Porous Hollow-Fiber Membrane A composite porous hollow-fiber membrane was set on a fiber sample table so that the longitudinal direction of the composite porous hollow-fiber membrane was vertical. Using an X-ray diffractometer (SmartLab, manufactured by Rigaku Corp.; for polymers; CuKα line), the composite porous hollow-fiber membrane was examined by X-ray diffractometry (2θ/θ scanning, β scanning). First, the presence of a peak top at 2θ=20.4° was ascertained by 2θ/θ scanning. Next, with respect to the diffraction peak at 2θ=20.40, intensity was measured by β scanning along the direction of azimuth from 0° to 360° to thereby obtain an azimuth-direction intensity distribution. In the case where the ratio between the intensity at an azimuth of 180° and the intensity at an azimuth of 90° was 0.80 or less or 1.25 or larger, this intensity distribution was regarded as having a peak, and the width of the peak in this azimuth-direction intensity distribution as measured at a position corresponding to a half of the height of the peak (half-value width H) was determined. The degree of orientation π was calculated therefrom using the following formula (1). Incidentally, since minimal values of β-scanning intensity were observed at around 0° and 180°, a straight line passing through these was taken as a base line.

Degree of orientation π=(180°−H)/180°　　(1)

(4) Average Value v of Raman Orientation Parameter

Orientation parameters of poly(vinylidene fluoride) homopolymer in columnar textures were determined by the following operation.

A composite porous hollow-fiber membrane was cut with a microtome along the longitudinal direction of the composite porous hollow-fiber membrane to thereby obtain sections of the membrane. Ten columnar textures were selected per one composite porous hollow-fiber membrane. Each columnar texture was examined for scattering intensity by laser Raman spectroscopy at intervals of 1 μm along the longitudinal direction while ascertaining the columnar texture with an optical microscope.

The orientation parameter for each measuring point was calculated using formula (2), and an average value of the thus-obtained orientation parameters was taken as the average value v of Raman orientation parameter. Furthermore, with respect to each of the ten different columnar textures, a largest orientation parameter and a smallest orientation parameter were selected. These ten largest orientation parameters were averaged to obtain a maximum Raman orientation parameter M, and the ten smallest orientation parameters were averaged to obtain a minimum Raman orientation parameter m. M/m was calculated therefrom.

Orientation parameter=(I1270-parallel/I840-parallel)/(I1270-vertical/I840-vertical)　　(2)

I1270-parallel: Raman band intensity at 1,270 cm$^{-1}$ under parallel conditions I1270-vertical: Raman band intensity at 1,270 cm$^{-1}$ under vertical conditions I840-parallel: Raman band intensity at 840 cm$^{-1}$ under the parallel conditions, I840-vertical: Raman band intensity at 840 cm$^{-1}$ under the vertical conditions The parallel conditions: the longitudinal direction of the composite porous hollow-fiber membrane is parallel with a polarization direction The vertical conditions: the longitudinal direction of the composite porous hollow-fiber membrane is orthogonal with the polarization direction The apparatus and conditions for the analysis by laser Raman spectroscopy are as follows.

Apparatus: T-64000, manufactured by Jobin Yvon/Atago Bussan K.K.

Conditions:

Measuring mode; micro-Raman

Objective lens; ×100

Beam diameter; 1 μm

Light source; Ar+laser/514.5 nm

Laser power; 100 mW

Diffraction grating; Single 600 gr/mm

Slit; 100 μm

Detector; CCD/Jobin Yvon 1024×256

(5) Longitudinal Length and Short-Side Length of Columnar Texture

A longitudinal section of the first layer of the composite porous hollow-fiber membrane produced in each Example or Comparative Example was photographed at a magnification of 3,000 times using a scanning electron microscope (Strata 400S, manufactured by FEI Company). Ten columnar textures were arbitrarily selected from the photograph image, and the longitudinal length and short-side length of each columnar texture were measured. Measured as the longitudinal length of each columnar texture was the maximum length in the longitudinal direction. As described above, a value obtained by dividing the longitudinal length of each columnar texture by 1 μm and omitting any figures below the decimal point was taken as the number of measuring points, and the short-side lengths were measured at the measuring points and averaged. Thus, the short-side length of each columnar texture was determined.

The photographing was conducted on five portions, and ten columnar textures arbitrarily selected from each of the five photograph images were examined to determine the longitudinal length and short-side length. Thus, a total of fifty longitudinal lengths and a total of fifty short-side lengths were obtained. Subsequently, an average value of the fifty longitudinal lengths in total was calculated to obtain a representative value of the longitudinal lengths, and an average value of the fifty short-side lengths in total was calculated to obtain a representative value of the short-side lengths.

(6) Thickness Uniformity

First, a composite porous hollow-fiber membrane was embedded in an epoxy resin and dyed with osmium, thereby filling the void portions with the epoxy resin. Next, using a scanning electron microscope (Strata 400S, manufactured by FEI Company) equipped with a focused ion beam (FIB) irradiation device, the composite porous hollow-fiber membrane was cut with an FIB to obtain a section parallel with the short-side direction of the composite porous hollow-fiber membrane, and the cutting with an FIB and an SEM examination were repeatedly conducted 200 times at intervals of 50 nm along the longitudinal direction of the composite porous hollow-fiber membrane. Thus, information concerning a depth of 10 μm was obtained.

The thickness uniformity was determined by comparing a first cross-section and a second cross-section which were parallel with the short-side direction of the composite porous hollow-fiber membrane and obtained by the consecutive cross-section examination using an FIB. The first and second cross-sections were parallel with each other and apart from each other at a distance of 5 jim. Twenty sets of such first and second cross-sections were selected.

In each selected section, the first layer only was examined. Portions constituted of a resin are distinguished from void portions (epoxy portions) in each cross-section, and the area of the resin portions and the area of the void portions were measured. Next, the first cross-section was projected on the second cross-section from a direction perpendicular to both cross-sections to measure the area of portions in each of which a resin portion of the first cross-section coincided with a resin portion of the second cross-section (i.e., the area of overlaps).

Thickness uniformity was determined by calculating an average of thickness uniformities A and B determined using the following formulae (3) and (4). The thus-obtained twenty average values of A and B were averaged, and this average value was taken as the thickness uniformity of the membrane.

Thickness uniformity $A$=(area of overlaps)/(area of resin portions in second cross-section) (3)

Thickness uniformity $B$=(area of overlaps)/(area of resin portions in first cross-section) (4)

In cases when at least sixteen sets each had a thickness uniformity of 0.60 or higher, this membrane was regarded as having a columnar texture. In cases when the number of sets each having such thickness uniformity was 15 or less, this membrane was regarded as having a fibrous texture.

(7) Porosity

Porosity was determined in the following manner. Twenty cross-sections were arbitrarily selected from the twenty sets of first and second cross-sections obtained in "(6) Thickness Uniformity", i.e., from the forty cross-sections in total. With respect to the first-layer cross-section in each of the twenty cross-sections, the porosity was determined from the area of resin portions and the area of void portions using the following formula (5). An average value of these porosities was used.

Porosity (%)={100×(area of void portion)}/{(area of resin portion)+(area of void portion)} (5)

(8) Occupancy of Texture

A longitudinal section of the first layer was examined with a scanning electron microscope (Strata 400S, manufactured by FEI Company) to photograph arbitrarily selected twenty portions thereof at a magnification of 3,000 times. Occupancy in each of the twenty portions was determined using the following formula (6), and an average value of these was employed. The area of the entire photograph and the area of each texture were determined by printing the photograph on paper, measuring both the weight of a portion of the paper which corresponded to the entire photograph and the weight of a portion of the paper which corresponded to the texture and which had been cut out of the paper, and converting the measured weights to areas.

Occupancy (%)={(area of each texture)/(area of entire photograph)}×100 (6)

(9) Crystallization Temperature Tc of Fluororesin-Based-Polymer Solution

Using DSC-6200, manufactured by Seiko Instruments & Electronics Ltd., a mixture having the same composition as a membrane-forming polymer raw liquid composition containing a fluororesin-based polymer, a solvent, etc. was enclosed in a sealable DSC container, heated to a dissolution temperature at a hating rate of 10° C./min, and held at that temperature for 30 minutes, thereby evenly dissolving the solid matter, and the contents were then cooled at a cooling rate of 10° C./min. A rise temperature for a crystallization peak observed during the cooling was taken as the crystallization temperature Tc.

(10) Average Pore Diameter of Outer Surface

The average pore diameter of an outer surface was determined by photographing the surface of a fluororesin-based polymer separation membrane with the scanning electron microscope (Strata 400S, manufactured by FEI Company) at a magnification of 60,000 times, measuring the diameter of each of arbitrarily selected thirty pores, and calculating a number-average of the measured diameters.

(11) Membrane Thickness

The fluororesin-based polymer separation membranes of the Examples each had a second layer as the outer layer and had a columnar texture in the inner layer. The average thickness of the outer layer, which had a three-dimensional network texture, and the average thickness of the inner layer, which had a columnar texture, were determined by photographing a cross-section of the fluororesin-based polymer separation membrane using the scanning electron microscope at magnifications of 100 times and 1,000 times, and calculating the average thicknesses from the photographs by the following methods.

First, the average thickness of the second layer was determined in the following manner. On the photograph of 1,000 times, a line is drawn from any point on the outer-layer surface toward the inner layer perpendicularly to the tangent to the outer-layer surface until the line first meets a columnar texture, and the distance from that point to the columnar texture is measured. This distance is the thickness of the second layer. This operation was performed on arbitrarily selected thirty portions, and a number-average thereof was obtained. Thus, the average thickness of the second layer was calculated.

An average thickness of the first layer can be calculated in the same manner. However, since the first layer in each Example is thick, an image covering from a surface to the opposite surface of the cross-section of the fluororesin-based polymer separation membrane cannot be entirely included in the screen when the cross-section is photographed at a magnification of 1,000 times, and several photographs need to be put together. Because of this, the following method was selected in place of taking several photographs at a magnification of 1,000 times.

The cross-section was photographed at a magnification of 100 times to determine the thickness of the fluororesin-based polymer separation membrane (distance from a surface to the opposite surface of the cross-section of the fluororesin-based polymer separation membrane). A value obtained by subtracting the average thickness of the second layer from that thickness of the fluororesin-based polymer separation membrane is the thickness of the first layer. This operation was performed on arbitrarily selected thirty portions, and a number-average thereof was obtained. Thus, the average thickness of the first layer was calculated.

<Macrovoids>

Whether a three-dimensional network texture had macrovoids or not was assessed by photographing cross-sections of the second layer using the scanning electron microscope at a magnification of 3,000 times. Specifically, thirty different cross-sections thereof were examined. In cases when there were no macrovoids or where there were only macrovoids having a major-axis length less than ten times the surface-pore diameter, then this three-dimensional network texture was deemed to have no macrovoids. In cases when at least one macrovoid having a major-axis length not less than ten times the surface-pore diameter was observed, then this three-dimensional network texture was deemed to have macrovoids.

Example 1

Thirty-six percent by weight vinylidene fluoride homopolymer (KF1300, manufactured by Kureha Corp.; weight-average molecular weight, 417,000; number-average molecular weight, 221,000) and 64% by weight γ-butyrolactone were dissolved at 150° C. This vinylidene fluoride homopolymer solution had a crystallization temperature Tc of 48° C.

For pressurizing and ejecting the membrane-forming raw liquid, use was made of a device including a double tube-type spinneret, pipelines connected to the spinneret, and two gear pumps disposed on one of the pipelines.

The membrane-forming raw liquid was allowed to stay for 20 seconds at 99-101° C. in the pipeline between the gear pumps while being pressurized at 2.0 MPa. Thereafter, the membrane-forming raw liquid was ejected through the outer orifice of the double tube-type spinneret while ejecting an 85% by weight aqueous solution of γ-butyrolactone through the inner orifice. The membrane-forming raw liquid thus ejected was allowed to stay for 20 seconds in a cooling bath having a temperature of 25° C. and containing an 85% by weight aqueous solution of γ-butyrolactone, thereby solidifying the raw liquid.

The hollow fiber obtained had columnar textures having a thickness uniformity of 0.62. The occupancy of the columnar textures was 86%, and the occupancy of spherical textures was 14%.

Subsequently, the hollow fiber obtained above was drawn in 95° C. water 2.5 times. The hollow fiber which had been drawn was examined and, as a result, columnar textures were observed. This hollow fiber had columnar textures having a representative value of longitudinal length of 16 μm, a representative value of short-side length of 2.2 μm, and a thickness uniformity of 0.61 and had a porosity of 55%. The vinylidene fluoride homopolymer molecular chains in the hollow fiber had a degree of orientation π, in the longitudinal direction of the hollow fiber, of 0.61, an average value ν of Raman orientation parameter of 3.12, and an M/m of 3.1. The structure and performances of the drawn hollow fiber are shown in Table 1.

Fourteen percent by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a membrane-forming raw liquid.

This membrane-forming raw liquid was evenly applied to the hollow fiber obtained by the operation described above, and was immediately coagulated in a 50° C. water bath, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 1.

The thus-obtained composite porous hollow-fiber membrane was used to fabricate a membrane module having a diameter of 3 cm, a height of 50 cm, and an effective membrane area of 0.3 m².

This membrane module was used to conduct constant-rate external-pressure dead end filtration of the water of Lake Biwa. A booster pump was used to pressurize and supply the raw water, and the linear velocity for filtration was regulated to 3 m/d. At intervals of 120 minutes, 30-second backwashing with a 5 ppm aqueous solution of sodium hypochlorite and 1-minute air scrubbing were performed. This filtration operation was continuously performed for 1 month from Feb. 1 to Mar. 1, 2016.

The filtration pressure difference just after the physical cleaning was measured at the time of initiation of the filtration operation (filtration pressure difference A) and at the time of termination of the filtration operation (filtration pressure difference B). The smaller the value of A, the lower the energy required for initiating the operation. The rate of increase in filtration pressure difference (%) was calculated using (B−A)×(1/A)×100. The lower the rate of increase in filtration pressure difference, the more stably the module can be operated. Namely, smaller values thereof mean that the module has excellent operability. Consequently, in cases when the value of A is smaller and the rate of increase in filtration pressure difference is lower, this means that this membrane enables the module to be more stably operated with lower energy. The filtration time (120 minutes), which is longer than the filtration time (30 minutes) supposed in actual operations, was set in order to evaluate operability in a short period.

As a result of the operability evaluation, the filtration pressure difference at initiation of the filtration operation was 31 kPa and the filtration pressure difference at termination of the filtration operation was 40 kPa, showing that the filtration pressure difference at initiation of the filtration operation was low. The rate of increase in filtration pressure difference was as low as 29%. This module was found to be stably operable.

Example 2

Thirty-six percent by weight vinylidene fluoride homopolymer (KF1300, manufactured by Kureha Corp.; weight-average molecular weight, 417,000; number-average molecular weight, 221,000) and 64% by weight γ-butyrolactone were dissolved at 150° C. This vinylidene fluoride homopolymer solution had a Tc of 48° C.

Using the same device as in Example 1, the membrane-forming raw liquid was pressurized to 2.0 MPa and allowed to stay for 20 seconds at 99-101° C. Thereafter, the membrane-forming raw liquid was ejected through the outer orifice of the double tube-type spinneret while ejecting an 85% by weight aqueous solution of γ-butyrolactone through the inner orifice of the double tube-type spinneret. The ejected membrane-forming raw liquid was allowed to stay for 10 seconds in a first cooling bath having a temperature of 5° C. and containing an 85% by weight aqueous solution of γ-butyrolactone and then allowed to stay for 20 seconds in a second cooling bath having a temperature of 25° C. and containing an 85% by weight aqueous solution of γ-butyrolactone, thereby solidifying the raw liquid.

The hollow fiber obtained had columnar textures having a thickness uniformity of 0.65. The occupancy of the columnar textures was 87%, and the occupancy of spherical textures was 13%.

Subsequently, the hollow fiber obtained above was drawn in 95° C. water 3 times. The drawn hollow fiber had columnar textures having a longitudinal length of 19 μm, a short-side length of 1.8 μm, and a thickness uniformity of 0.66 and had a porosity of 61%. The vinylidene fluoride homopolymer molecular chains in the hollow fiber had a degree of orientation π, in the longitudinal direction of the hollow fiber, of 0.77, an average value ν of Raman orientation parameter of 3.74, and an M/m of 4.2. The structure and performances of the drawn hollow fiber are shown in Table 1.

Fourteen percent by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a membrane-forming raw liquid.

This membrane-forming raw liquid was evenly applied to the hollow fiber obtained by the operation described above, and was immediately coagulated in a 50° C. water bath, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 1.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 30 kPa and the filtration pressure difference at termination of the filtration operation was 38 kPa, showing that the filtration pressure difference at initiation of the filtration operation was low.

The rate of increase in filtration pressure difference was as low as 27%. This module was found to be stably operable.

Example 3

Thirty-eight percent by weight vinylidene fluoride homopolymer (KF1300, manufactured by Kureha Corp.; weight-average molecular weight, 417,000; number-average molecular weight, 221,000) and 62% by weight γ-butyrolactone were dissolved at 150° C. This vinylidene fluoride homopolymer solution had a Tc of 51° C.

Using the same device as in Example 1, the membrane-forming raw liquid was pressurized to 2.0 MPa and allowed to stay for 20 seconds at 99-101° C. Thereafter, the membrane-forming raw liquid was ejected through the outer orifice of the double tube-type spinneret while ejecting an 85% by weight aqueous solution of γ-butyrolactone through the inner orifice. The ejected membrane-forming raw liquid was allowed to stay for 10 seconds in a first cooling bath having a temperature of 5° C. and containing an 85% by weight aqueous solution of γ-butyrolactone and then allowed to stay for 50 seconds in a second cooling bath having a temperature of 35° C. and containing an 85% by weight aqueous solution ofγ-butyrolactone, thereby solidifying the raw liquid.

The hollow fiber obtained had columnar textures having a thickness uniformity of 0.66. The occupancy of the columnar textures was 91%, and the occupancy of spherical textures was 9%.

Subsequently, the hollow fiber obtained above was drawn in 95° C. water 3 times. The drawn hollow fiber had columnar textures having a longitudinal length of 24 μm, a short-side length of 1.6 μm, and a thickness uniformity of 0.66 and had a porosity of 59%. The vinylidene fluoride homopolymer molecular chains in the hollow fiber had a degree of orientation π, in the longitudinal direction of the hollow fiber, of 0.85, an average value ν of Raman orientation parameter of 4.37, and an M/m of 5.0. The structure and performances of the drawn hollow fiber are shown in Table 1.

Fourteen percent by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a membrane-forming raw liquid.

This membrane-forming raw liquid was evenly applied to the hollow fiber obtained by the operation described above, and was immediately coagulated in a 50° C. water bath, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 1.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 30 kPa and the filtration pressure difference at termination of the filtration operation was 39 kPa, showing that the filtration pressure difference at initiation of the filtration operation was low. The rate of increase in filtration pressure difference was as low as 30%. This module was found to be stably operable.

Example 4

Thirty-eight percent by weight vinylidene fluoride homopolymer (KF1300, manufactured by Kureha Corp.; weight-average molecular weight, 417,000; number-average molecular weight, 221,000) and 62% by weight γ-butyrolactone were dissolved at 150° C. This vinylidene fluoride homopolymer solution had a Tc of 51° C.

Two gear pumps were disposed to thereby pressurize the solution to 2.0 MPa in the line between the pumps and allow the pressurized solution to stay for 20 seconds at 99-101° C. Thereafter, the polymer solution was ejected through the outer orifice of a double tube-type spinneret while simultaneously ejecting an 85% by weight aqueous solution of γ-butyrolactone through the inner orifice of the double tube-type spinneret. The ejected polymer solution was allowed to stay for 10 seconds in a first cooling bath having a temperature of 5° C. and containing an 85% by weight aqueous solution of γ-butyrolactone and then allowed to stay for 50 seconds in a second cooling bath having a temperature of 35° C. and containing an 85% by weight aqueous solution of γ-butyrolactone, thereby solidifying the polymer solution.

The hollow fiber obtained had columnar textures having a thickness uniformity of 0.66. The occupancy of the columnar textures was 91%, and the occupancy of spherical textures was 9%.

Subsequently, the hollow fiber obtained above was drawn in 95° C. water 3.5 times. The drawn hollow fiber had columnar textures having a longitudinal length of 28 μm, a short-side length of 1.3 μm, and a thickness uniformity of 0.62 and had a porosity of 61%. The vinylidene fluoride homopolymer molecular chains in the hollow fiber had a degree of orientation π, in the longitudinal direction of the hollow fiber, of 0.89, an average value v of Raman orientation parameter of 4.42, and an M/m of 5.1. The structure and performances of the drawn hollow fiber are shown in Table 1.

Figure 2:
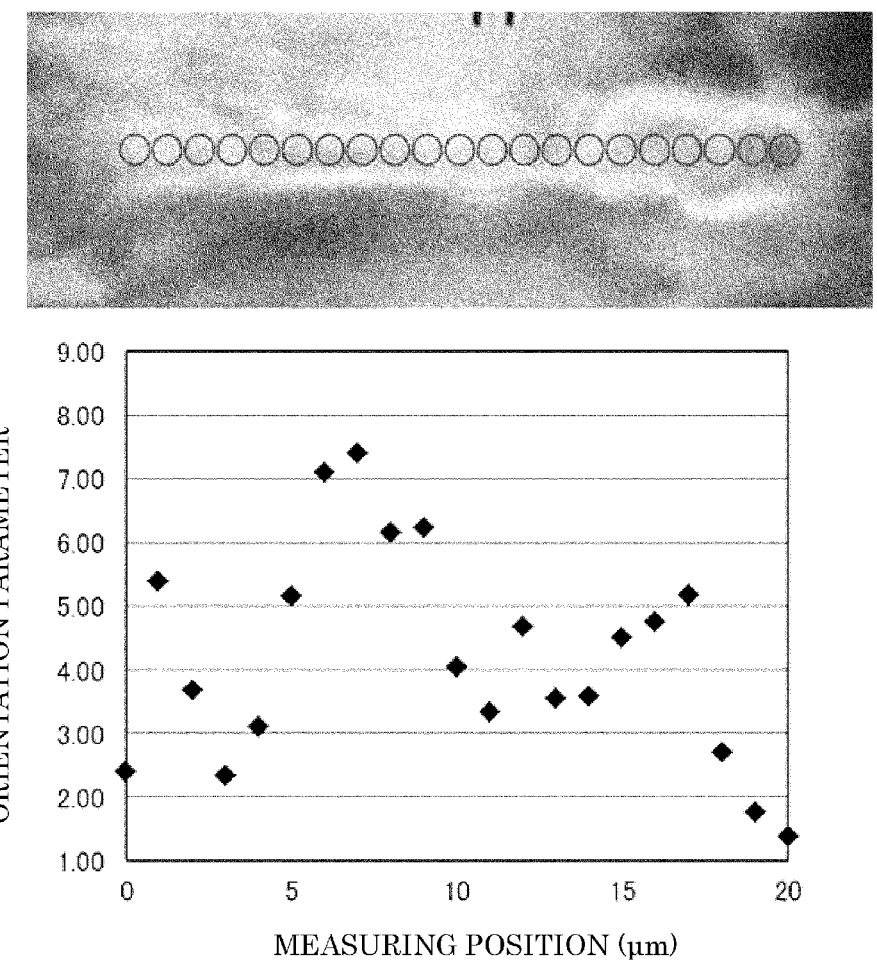
FIG. 2 is a diagram showing Raman orientation parameters at respective measuring points of the drawn hollow fiber of Example 4.
Figure 3:
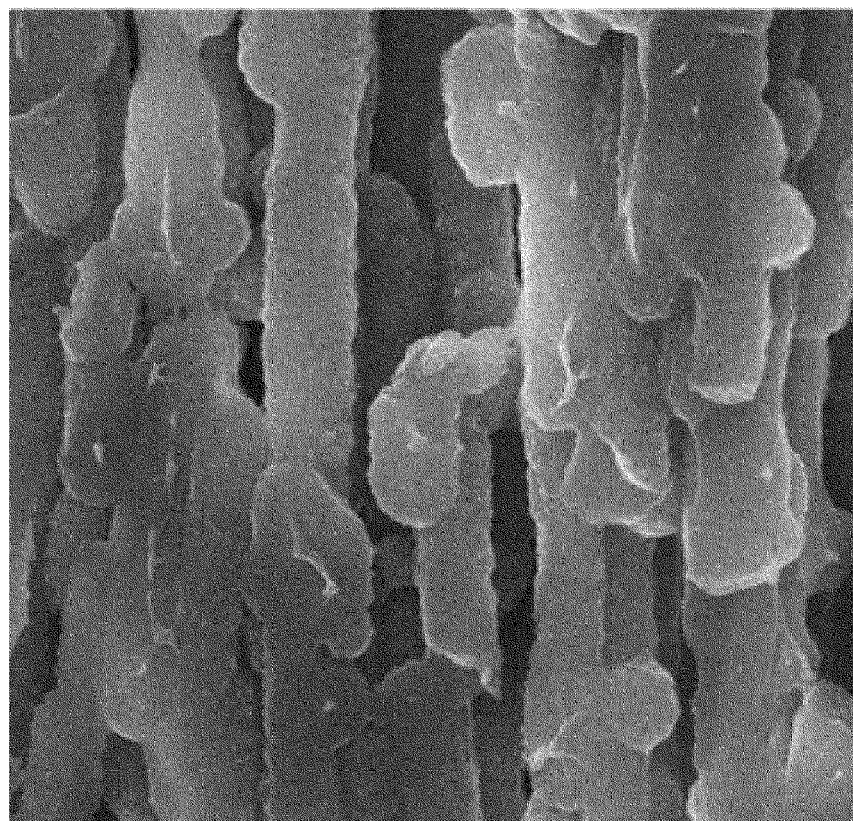
FIG. 3 is a diagram showing a photograph of a longitudinal section of the drawn hollow fiber of Example 4.

In FIG. 1 is shown an azimuth-direction intensity distribution at 2θ=20.4° of the drawn hollow fiber. In FIG. 2 are shown Raman orientation parameters at respective measuring points of the drawn hollow fiber. In FIG. 3 is shown a photograph of a longitudinal section of the drawn hollow fiber.

Furthermore, 14% by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a polymer solution.

This membrane-forming raw liquid was evenly applied to the hollow fiber obtained by the operation described above, and was immediately coagulated in a 50° C. water bath, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 1.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 29 kPa and the filtration pressure difference at termination of the filtration operation was 37 kPa, showing that the filtration pressure difference at initiation of the filtration operation was low. The rate of increase in filtration pressure difference was as low as 28%. This module was found to be stably operable.

Example 5

Forty percent by weight vinylidene fluoride homopolymer (KF1300, manufactured by Kureha Corp.; weight-average molecular weight, 417,000; number-average molecular weight, 221,000) and 60% by weight dimethyl sulfoxide were dissolved at 130° C. This vinylidene fluoride homopolymer solution had a Tc of 30° C.

Two gear pumps were disposed to thereby pressurize the solution to 2.0 MPa in the line between the pumps and allow the pressurized solution to stay for 20 seconds at 78-80° C. Thereafter, the polymer solution was ejected through the outer orifice of a double tube-type spinneret while simultaneously ejecting a 90% by weight aqueous solution of dimethyl sulfoxide through the inner orifice of the double tube-type spinneret. The ejected polymer solution was allowed to stay for 20 seconds in a cooling bath having a temperature of 20° C. and containing an 85% by weight aqueous solution of dimethyl sulfoxide, thereby solidifying the polymer solution.

The hollow fiber obtained had columnar textures having a thickness uniformity of 0.62. The occupancy of the columnar textures was 93%, and the occupancy of spherical textures was 7%.

Subsequently, the hollow fiber obtained above was drawn in 95° C. water 2.5 times. The drawn hollow fiber had columnar textures having a longitudinal length of 20 μm, a short-side length of 2.1 μm, and a thickness uniformity of 0.61 and had a porosity of 64%. The vinylidene fluoride homopolymer molecular chains in the hollow fiber had a degree of orientation π, in the longitudinal direction of the hollow fiber, of 0.66, an average value v of Raman orientation parameter of 3.40, and an M/m of 3.5. The structure and performances of the drawn hollow fiber are shown in Table 1.

Furthermore, 14% by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a polymer solution. This membrane-forming raw liquid was evenly applied to the hollow fiber obtained by the operation described above, and was immediately coagulated in a 50° C. water bath, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 1.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 31 kPa and the filtration pressure difference at termination of the filtration operation was 41 kPa, showing that the filtration pressure difference at initiation of the filtration operation was low. The rate of increase in filtration pressure difference was as low as 32%. This module was found to be stably operable.

Example 6

Forty percent by weight vinylidene fluoride homopolymer (KF1300, manufactured by Kureha Corp.; weight-average molecular weight, 417,000; number-average molecular weight, 221,000) and 60% by weight dimethyl sulfoxide were dissolved at 130° C. This vinylidene fluoride homopolymer solution had a Tc of 30° C.

Two gear pumps were disposed to thereby pressurize the solution to 2.0 MPa in the line between the pumps and allow the pressurized solution to stay for 20 seconds at 78-80° C. Thereafter, the polymer solution was ejected through the outer orifice of a double tube-type spinneret while simultaneously ejecting a 90% by weight aqueous solution of dimethyl sulfoxide through the inner orifice of the double tube-type spinneret. The ejected polymer solution was allowed to stay for 10 seconds in a first cooling bath having a temperature of −5° C. and containing an 85% by weight aqueous solution of dimethyl sulfoxide and then allowed to stay for 30 seconds in a second cooling bath having a temperature of 15° C. and containing an 85% by weight aqueous solution of dimethyl sulfoxide, thereby solidifying the polymer solution.

The hollow fiber obtained had columnar textures having a thickness uniformity of 0.72. The occupancy of the columnar textures was 92%, and the occupancy of spherical textures was 8%.

Subsequently, the hollow fiber obtained above was drawn in 95° C. water 3 times. The drawn hollow fiber had columnar textures having a longitudinal length of 27 μm, a short-side length of 1.7 μm, and a thickness uniformity of 0.69 and had a porosity of 64%. The vinylidene fluoride homopolymer molecular chains in the hollow fiber had a degree of orientation π, in the longitudinal direction of the hollow fiber, of 0.86, an average value v of Raman orientation parameter of 4.38, and an M/m of 5.1. The structure and performances of the drawn hollow fiber are shown in Table 1.

Furthermore, 14% by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a polymer solution.

This membrane-forming raw liquid was evenly applied to the hollow fiber obtained by the operation described above, and was immediately coagulated in a 50° C. water bath, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 1.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 30 kPa and the filtration pressure difference at termination of the filtration operation was 38 kPa, showing that the filtration pressure difference at initiation of the filtration operation was low. The rate of increase in filtration pressure difference was as low as 27%. This module was found to be stably operable.

Example 7

Forty percent by weight vinylidene fluoride homopolymer (KF1300, manufactured by Kureha Corp.; weight-average molecular weight, 417,000; number-average molecular weight, 221,000) and 60% by weight dimethyl sulfoxide were dissolved at 130° C. This vinylidene fluoride homopolymer solution had a Tc of 30° C.

Two gear pumps were disposed to thereby pressurize the solution to 2.0 MPa in the line between the pumps and allow the pressurized solution to stay for 20 seconds at 78-80° C. Thereafter, the polymer solution was ejected through the outer orifice of a double tube-type spinneret while simultaneously ejecting a 90% by weight aqueous solution of dimethyl sulfoxide through the inner orifice of the double tube-type spinneret. The ejected polymer solution was allowed to stay for 10 seconds in a first cooling bath having a temperature of −5° C. and containing an 85% by weight aqueous solution of dimethyl sulfoxide and then allowed to stay for 50 seconds in a second cooling bath having a temperature of 20° C. and containing an 85% by weight aqueous solution of dimethyl sulfoxide, thereby solidifying the polymer solution. The hollow fiber obtained had columnar textures having a thickness uniformity of 0.72. The occupancy of the columnar textures was 95%, and the occupancy of spherical textures was 5%.

Subsequently, the hollow fiber obtained above was drawn in 95° C. water 3.5 times. The drawn hollow fiber had columnar textures having a longitudinal length of 35 μm, a short-side length of 1.5 μm, and a thickness uniformity of 0.67 and had a porosity of 65%. The vinylidene fluoride homopolymer molecular chains in the hollow fiber had a degree of orientation π, in the longitudinal direction of the hollow fiber, of 0.91, an average value v of Raman orientation parameter of 4.62, and an M/m of 5.8. The structure and performances of the drawn hollow fiber are shown in Table 1.

Furthermore, 14% by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a polymer solution.

This membrane-forming raw liquid was evenly applied to the hollow fiber obtained by the operation described above, and was immediately coagulated in a 50° C. water bath, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 1.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 30 kPa and the filtration pressure difference at termination of the filtration operation was 37 kPa, showing that the filtration pressure difference at initiation of the filtration operation was low. The rate of increase in filtration pressure difference was as low as 23%. This module was found to be stably operable.

Example 8

Forty percent by weight vinylidene fluoride homopolymer (KF1300, manufactured by Kureha Corp.; weight-average molecular weight, 417,000; number-average molecular weight, 221,000) and 60% by weight dimethyl sulfoxide were dissolved at 130° C. This vinylidene fluoride homopolymer solution had a Tc of 30° C.

Two gear pumps were disposed to thereby pressurize the solution to 2.0 MPa in the line between the pumps and allow the pressurized solution to stay for 20 seconds at 78-80° C. Thereafter, the polymer solution was ejected through the outer orifice of a double tube-type spinneret while simultaneously ejecting a 90% by weight aqueous solution of dimethyl sulfoxide through the inner orifice of the double tube-type spinneret. The ejected polymer solution was allowed to stay for 10 seconds in a first cooling bath having a temperature of −5° C. and containing an 85% by weight aqueous solution of dimethyl sulfoxide and then allowed to stay for 50 seconds in a second cooling bath having a temperature of 20° C. and containing an 85% by weight aqueous solution of dimethyl sulfoxide, thereby solidifying the polymer solution. The hollow fiber obtained had columnar textures having a thickness uniformity of 0.72. The occupancy of the columnar textures was 95%, and the occupancy of spherical textures was 5%.

Subsequently, the hollow fiber obtained above was drawn in 95° C. water 4 times. The drawn hollow fiber had columnar textures having a longitudinal length of 40 μm, a short-side length of 1.1 μm, and a thickness uniformity of 0.63 and had a porosity of 66%. The vinylidene fluoride homopolymer molecular chains in the hollow fiber had a degree of orientation n, in the longitudinal direction of the hollow fiber, of 0.92, an average value v of Raman orientation parameter of 4.76, and an M/m of 6.2. The structure and performances of the drawn hollow fiber are shown in Table 1.

Furthermore, 14% by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a polymer solution.

This membrane-forming raw liquid was evenly applied to the hollow fiber obtained by the operation described above, and was immediately coagulated in a 50° C. water bath, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 1.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 29 kPa and the filtration pressure difference at termination of the filtration operation was 37 kPa, showing that the filtration pressure difference at initiation of the filtration operation was low. The rate of increase in filtration pressure difference was as low as 28%. This module was found to be stably operable.

Example 9

Fourteen percent by weight vinylidene fluoride homopolymer having a weight-average molecular weight of 284,000, 1.25% by weight poly(vinyl acetate) (manufactured by Nacalai Tesque, Inc.; 75% ethanol solution; degree of polymerization, 500), 76.75% by weight N-methyl-2-pyrrolidone, 5% by weight T-20C, and 3% by weight water were mixed together and dissolved at a temperature of 95° C. to prepare a polymer solution.

This membrane-forming raw liquid was evenly applied to the drawn hollow fiber produced in Example 8, and was immediately coagulated in a 50° C. water bath, thereby producing a composite porous hollow-fiber membrane having both the columnar textures and a three-dimensional network texture disposed on the outer side thereof.

The hollow fiber obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 1.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 29 kPa and the filtration pressure difference at termination of the filtration operation was 37 kPa, showing that the filtration pressure difference at initiation of the filtration operation was low. The rate of increase in filtration pressure difference was as low as 28%. This module was found to be stably operable.

Example 10

Fourteen percent by weight vinylidene fluoride homopolymer having a weight-average molecular weight of 284,000, 1% by weight ethylene/vinyl acetate copolymer (Polyace RDH, manufactured by Taisei Kayaku K.K.; containing 68.5-71.5 mol % vinyl acetate), 77% by weight N-methyl-2-pyrrolidone, 5% by weight T-20C, and 3% by weight water were mixed together and dissolved at a temperature of 95° C. to prepare a polymer solution.

This membrane-forming raw liquid was evenly applied to the drawn hollow fiber produced in Example 8, and was immediately coagulated in a 50° C. water bath, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.03 μm and an average thickness of 35 rm. The structure and performances of the composite porous hollow-fiber membrane are shown in Table 1.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 30 kPa and the filtration pressure difference at termination of the filtration operation was 37 kPa, showing that the filtration pressure difference at initiation of the filtration operation was low. The rate of increase in filtration pressure difference was as low as 23%. This module was found to be stably operable.

Example 11

Fourteen percent by weight vinylidene fluoride homopolymer having a weight-average molecular weight of 284,000, 5% by weight cellulose acetate (CA435-75S, manufactured by Eastman Chemical Company; cellulose triacetate), 81% by weight N-methyl-2-pyrrolidone, and 1% by weight water were mixed together and dissolved at a temperature of 95° C. to prepare a polymer solution.

This membrane-forming raw liquid was evenly applied to the drawn hollow fiber produced in Example 8, and was immediately coagulated in an 80° C. coagulating bath containing a 20% by weight aqueous solution of N-methyl-2-pyrrolidone, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.5 μm and an average thickness of 35 μm. The structure and performances of the composite porous hollow-fiber membrane are shown in Table 1.

Figure 7:
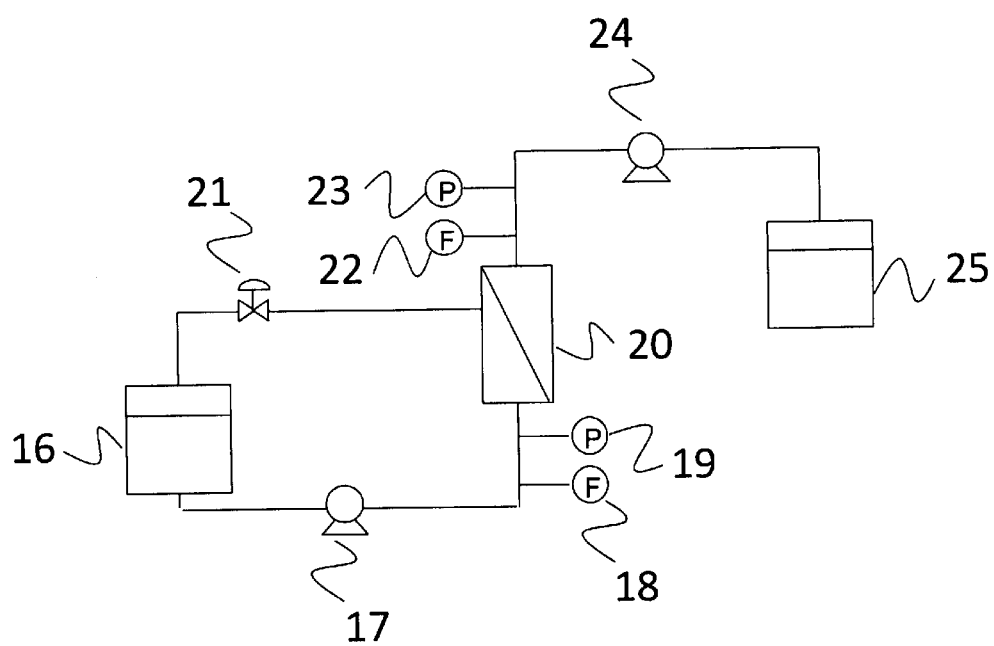
FIG. 7 is a diagram illustrating the filtration device used in the Examples.

A composite porous hollow-fiber membrane module produced using the thus-obtained composite porous hollow-fiber membrane was used in the filtration device of FIG. 7 to perform cross flow filtration of beer. As the beer, use was made of Fujizakura Heights (registered trademark) Beer Pils (manufactured by Fuji Kanko Kaihatsu Co., Ltd.), which was commercial unfiltered beer. The cross flow filtration was conducted at a membrane-surface linear velocity of 0.5 m/s and a filtration rate per unit membrane area (filtration flux) of 2 m$^3$/m$^2$/d. The filtration was stopped at the time when the difference between the pressure on the side where the liquid to be filtrated was present and the pressure on the filtrate side (transmembrane pressure difference) reached 100 kPa. The transmembrane pressure difference reached 100 kPa at 5.8 hours after initiation of the filtration.

Example 12

Fourteen percent by weight vinylidene fluoride homopolymer having a weight-average molecular weight of 284,000, 5% by weight cellulose acetate (CA435-75S, manufactured by Eastman Chemical Company; cellulose triacetate), 81% by weight N-methyl-2-pyrrolidone, and 1% by weight water were mixed together and dissolved at a temperature of 95° C. to prepare a polymer solution.

This membrane-forming raw liquid was evenly applied to the drawn hollow fiber produced in Example 8, and was immediately coagulated in an 80° C. coagulating bath containing a 30% by weight aqueous solution of N-methyl-2-pyrrolidone, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.8 μm and an average thickness of 35 μm. The structure and performances of the composite porous hollow-fiber membrane are shown in Table 1.

A composite porous hollow-fiber membrane module produced using the thus-obtained composite porous hollow-fiber membrane was used in the filtration device of FIG. 7 to perform cross flow filtration of beer. As the beer, use was made of Fujizakura Heights (registered trademark) Beer Pils (manufactured by Fuji Kanko Kaihatsu Co., Ltd.), which was commercial unfiltered beer. The cross flow filtration was conducted at a membrane-surface linear velocity of 0.5 m/s and a filtration rate per unit membrane area (filtration flux) of 2 m$^3$/m$^2$/d. The filtration was stopped at the time when the difference between the pressure on the side where the liquid to be filtrated was present and the pressure on the filtrate side (transmembrane pressure difference) reached 100 kPa. The transmembrane pressure difference reached 100 kPa at 6.3 hours after initiation of the filtration.

Example 13

Fourteen percent by weight vinylidene fluoride homopolymer having a weight-average molecular weight of 284,000, 5% by weight cellulose acetate (CA435-75S, manufactured by Eastman Chemical Company; cellulose triacetate), 81% by weight N-methyl-2-pyrrolidone, and 1% by weight water were mixed together and dissolved at a temperature of 95° C. to prepare a polymer solution.

This membrane-forming raw liquid was evenly applied to the drawn hollow fiber produced in Example 8, and was immediately coagulated in an 80° C. coagulating bath containing 100% water, thereby producing a composite porous hollow-fiber membrane having both the columnar textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.3 am and an average thickness of 35 μm. The structure and performances of the composite porous hollow-fiber membrane are shown in Table 1.

A composite porous hollow-fiber membrane module produced using the thus-obtained composite porous hollow-fiber membrane was used in the filtration device of FIG. 7 to perform cross flow filtration of beer. As the beer, use was made of Fujizakura Heights (registered trademark) Beer Pils (manufactured by Fuji Kanko Kaihatsu Co., Ltd.), which was commercial unfiltered beer. The cross flow filtration was conducted at a membrane-surface linear velocity of 0.5 m/s and a filtration rate per unit membrane area (filtration flux) of 2 m$^3$/m$^2$/d. The filtration was stopped at the time when the difference between the pressure on the side where the liquid to be filtrated was present and the pressure on the filtrate side (transmembrane pressure difference) reached 100 kPa. The transmembrane pressure difference reached 100 kPa at 5.0 hour after initiation of the filtration.

Comparative Example 1

Thirty-eight percent by weight vinylidene fluoride homopolymer (KF1300, manufactured by Kureha Corp.; weight-average molecular weight, 417,000; number-average molecular weight, 221,000) and 62% by weight γ-butyrolactone were dissolved at 150° C. This vinylidene fluoride homopolymer solution had a Tc of 51° C.

Two gear pumps were disposed to thereby pressurize the solution to 2.0 MPa in the line between the pumps and allow the pressurized solution to stay for 20 seconds at 99-101° C. Thereafter, the polymer solution was ejected through the outer orifice of a double tube-type spinneret while simultaneously ejecting an 85% by weight aqueous solution of γ-butyrolactone through the inner orifice of the double tube-type spinneret. The ejected polymer solution was allowed to stay for 20 seconds in a cooling bath having a temperature of 5° C. and containing an 85% by weight aqueous solution of γ-butyrolactone, thereby solidifying the polymer solution.

The hollow fiber obtained had fibrous textures having a thickness uniformity of 0.47. The occupancy of the fibrous textures was 91%, and the occupancy of spherical textures was 9%.

Subsequently, the hollow fiber obtained above was drawn in 95° C. water 1.5 times. The drawn hollow fiber had fibrous textures having a longitudinal length of 15 μm, a short-side length of 2.2 μm, and a thickness uniformity of 0.45 and had a porosity of 63%. The vinylidene fluoride homopolymer molecular chains in the hollow fiber were in a non-oriented state and had an average value v of Raman orientation parameter of 1.01 and an M/m of 1.0. The structure and performances of the drawn hollow fiber are shown in Table 2.

Figure 4:
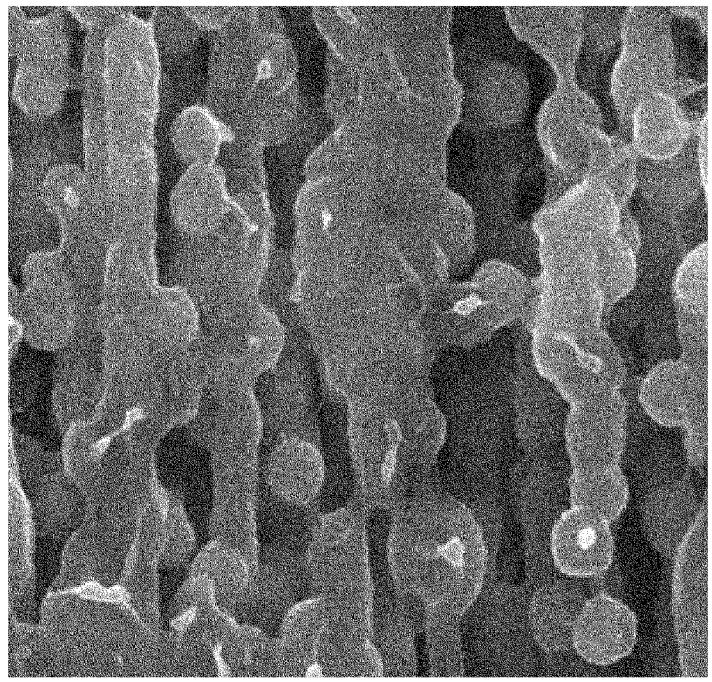
FIG. 4 is a diagram showing a photograph of a longitudinal section of the drawn hollow fiber of Comparative Example 1.

In FIG. 1 is shown an azimuth-direction intensity distribution at 2θ=20.40 of the drawn hollow fiber. In FIG. 4 is shown a photograph of a longitudinal section of the drawn hollow fiber.

Furthermore, 14% by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a polymer solution.

This membrane-forming raw liquid was evenly applied to the hollow fiber obtained by the operation described above, and was immediately coagulated in a 50° C. water bath, thereby producing a composite porous hollow-fiber membrane having both the fibrous textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 2.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 29 kPa. However, on the tenth day after initiation of the operation, fiber breakage occurred and the water of Lake Biwa leaked out to the filtrate side. The filtration was hence stopped.

Comparative Example 2

Thirty-eight percent by weight vinylidene fluoride homopolymer (KF1300, manufactured by Kureha Corp.; weight-average molecular weight, 417,000; number-average molecular weight, 221,000) and 62% by weight γ-butyrolactone were dissolved at 150° C. This vinylidene fluoride homopolymer solution had a Tc of 51° C.

Two gear pumps were disposed to thereby pressurize the solution to 2.0 MPa in the line between the pumps and allow the pressurized solution to stay for 20 seconds at 99-101° C. Thereafter, the polymer solution was ejected through the outer orifice of a double tube-type spinneret while simultaneously ejecting an 85% by weight aqueous solution of γ-butyrolactone through the inner orifice of the double tube-type spinneret. The ejected polymer solution was allowed to stay for 20 seconds in a cooling bath having a temperature of 5° C. and containing an 85% by weight aqueous solution of γ-butyrolactone, thereby solidifying the polymer solution.

The hollow fiber obtained had fibrous textures having a thickness uniformity of 0.47. The occupancy of the fibrous textures was 91%, and the occupancy of spherical textures was 9%.

Subsequently, the hollow fiber obtained above was drawn in 95° C. water 2.5 times. The drawn hollow fiber had fibrous textures having a longitudinal length of 18 m, a short-side length of 1.7 μm, and a thickness uniformity of 0.42 and had a porosity of 65%. The vinylidene fluoride homopolymer molecular chains in the hollow fiber were in a non-oriented state and had an average value v of Raman orientation parameter of 1.03 and an M/m of 1.1. The structure and performances of the drawn hollow fiber are shown in Table 2.

Furthermore, 14% by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a polymer solution.

This membrane-forming raw liquid was evenly applied to the hollow fiber obtained by the operation described above, and was immediately coagulated in a 50° C. water bath, thereby producing a composite porous hollow-fiber membrane having both the fibrous textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 2.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 28 kPa. However, on the twelfth day after initiation of the operation, fiber breakage occurred and the water of Lake Biwa leaked out to the filtrate side. The filtration was hence stopped.

Comparative Example 3

Thirty-eight percent by weight vinylidene fluoride homopolymer (KF1300, manufactured by Kureha Corp.; weight-average molecular weight, 417,000; number-average molecular weight, 221,000) and 62% by weight γ-butyrolactone were dissolved at 150° C. This vinylidene fluoride homopolymer solution had a Tc of 51° C.

Two gear pumps were disposed to thereby pressurize the solution to 2.0 MPa in the line between the pumps and allow the pressurized solution to stay for 20 seconds at 99-101° C. Thereafter, the polymer solution was ejected through the outer orifice of a double tube-type spinneret while simultaneously ejecting an 85% by weight aqueous solution of γ-butyrolactone through the inner orifice of the double tube-type spinneret. The ejected polymer solution was allowed to stay for 20 seconds in a cooling bath having a temperature of 5° C. and containing an 85% by weight aqueous solution of γ-butyrolactone, thereby solidifying the polymer solution.

The hollow fiber obtained had fibrous textures having a thickness uniformity of 0.47. The occupancy of the fibrous textures was 91%, and the occupancy of spherical textures was 9%.

Subsequently, it was attempted to draw the thus-obtained hollow fiber in 95° C. water 3.5 times. However, fiber breakage occurred to make the drawing impossible.

Comparative Example 4

Thirty-six percent by weight vinylidene fluoride homopolymer (KF1300, manufactured by Kureha Corp.; weight-average molecular weight, 417,000; number-average molecular weight, 221,000) and 64% by weight γ-butyrolactone were dissolved at 150° C. This vinylidene fluoride homopolymer solution had a Tc of 48° C.

Two gear pumps were disposed to thereby pressurize the solution to 0.2 MPa in the line between the pumps and allow the pressurized solution to stay for 20 seconds at 99-101° C. Thereafter, the polymer solution was ejected through the outer orifice of a double tube-type spinneret while simultaneously ejecting an 85% by weight aqueous solution of γ-butyrolactone through the inner orifice of the double tube-type spinneret. The ejected polymer solution was allowed to stay for 20 seconds in a cooling bath having a temperature of 5° C. and containing an 85% by weight aqueous solution of γ-butyrolactone, thereby solidifying the polymer solution.

The hollow fiber obtained had fibrous textures having a thickness uniformity of 0.42. The occupancy of the fibrous textures was 24%, and the occupancy of spherical textures was 76%.

Subsequently, it was attempted to draw the thus-obtained hollow fiber in 95° C. water 2 times. However, fiber breakage occurred to make the drawing impossible.

Comparative Example 5

Forty percent by weight vinylidene fluoride homopolymer (KF1300, manufactured by Kureha Corp.; weight-average molecular weight, 417,000; number-average molecular weight, 221,000) and 60% by weight dimethyl sulfoxide were dissolved at 130° C. This vinylidene fluoride homopolymer solution had a Tc of 30° C.

Two gear pumps were disposed to thereby pressurize the solution to 2.0 MPa in the line between the pumps and allow the pressurized solution to stay for 20 seconds at 78-80° C. Thereafter, the polymer solution was ejected through the outer orifice of a double tube-type spinneret while simultaneously ejecting a 90% by weight aqueous solution of dimethyl sulfoxide through the inner orifice of the double tube-type spinneret. The ejected polymer solution was allowed to stay for 20 seconds in a cooling bath having a temperature of 0° C. and containing an 85% by weight aqueous solution of dimethyl sulfoxide, thereby solidifying the polymer solution.

The hollow fiber obtained had fibrous textures having a thickness uniformity of 0.56. The occupancy of the fibrous textures was 84%, and the occupancy of spherical textures was 16%.

Subsequently, the hollow fiber obtained above was drawn in 95° C. water 1.5 times. The drawn hollow fiber had fibrous textures having a longitudinal length of 18 μm, a short-side length of 1.2 μm, and a thickness uniformity of 0.53 and had a porosity of 64%. The vinylidene fluoride homopolymer molecular chains in the hollow fiber were in a non-oriented state and had an average value ν of Raman orientation parameter of 1.03 and an M/m of 1.1. The structure and performances of the drawn hollow fiber are shown in Table 2.

Furthermore, 14% by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a polymer solution.

This membrane-forming raw liquid was evenly applied to the hollow fiber obtained by the operation described above, and was immediately coagulated in a 50° C. water bath, thereby producing a composite porous hollow-fiber membrane having both the fibrous textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 µm and an average thickness of 35 µm. The structure and performances of the composite porous hollow-fiber membrane are shown in Table 2.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 34 kPa. However, on the eleventh day after initiation of the operation, fiber breakage occurred and the water of Lake Biwa leaked out to the filtrate side. The filtration was hence stopped.

Comparative Example 6

Forty percent by weight vinylidene fluoride homopolymer (KF1300, manufactured by Kureha Corp.; weight-average molecular weight, 417,000; number-average molecular weight, 221,000) and 60% by weight dimethyl sulfoxide were dissolved at 130° C. This vinylidene fluoride homopolymer solution had a Tc of 30° C.

Two gear pumps were disposed to thereby pressurize the solution to 2.0 MPa in the line between the pumps and allow the pressurized solution to stay for 20 seconds at 78-80° C. Thereafter, the polymer solution was ejected through the outer orifice of a double tube-type spinneret while simultaneously ejecting a 90% by weight aqueous solution of dimethyl sulfoxide through the inner orifice of the double tube-type spinneret. The ejected polymer solution was allowed to stay for 20 seconds in a cooling bath having a temperature of 0° C. and containing an 85% by weight aqueous solution of dimethyl sulfoxide, thereby solidifying the polymer solution.

The hollow fiber obtained had fibrous textures having a thickness uniformity of 0.56. The occupancy of the fibrous textures was 84%, and the occupancy of spherical textures was 16%.

Subsequently, the hollow fiber obtained above was drawn in 95° C. water 2.5 times. The drawn hollow fiber had fibrous textures having a longitudinal length of 22 µm, a short-side length of 1.0 µm, and a thickness uniformity of 0.51 and had a porosity of 65%. The vinylidene fluoride homopolymer molecular chains in the hollow fiber were in a non-oriented state and had an average value ν of Raman orientation parameter of 1.05 and an M/m of 1.1. The structure and performances of the drawn hollow fiber are shown in Table 2.

Furthermore, 14% by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a polymer solution.

This membrane-forming raw liquid was evenly applied to the hollow fiber obtained by the operation described above, and was immediately coagulated in a 50° C. water bath, thereby producing a composite porous hollow-fiber membrane having both the fibrous textures and a three-dimensional network texture disposed on the outer side thereof.

The composite porous hollow-fiber membrane obtained had an outer diameter of 1,330 µm and an inner diameter of 770 µm, and the outer layer had an average surface-pore diameter of 0.04 µm and an average thickness of 35 µm. The structure and performances of the composite porous hollow-fiber membrane are shown in Table 2.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 32 kPa. However, on the eighteenth day after initiation of the operation, fiber breakage occurred and the water of Lake Biwa leaked out to the filtrate side. The filtration was hence stopped.

Comparative Example 7

Twenty-eight percent by weight vinylidene fluoride homopolymer (KF1300, manufactured by Kureha Corp.; weight-average molecular weight, 417,000; number-average molecular weight, 221,000) and 72% by weight dimethyl sulfoxide were dissolved at 130° C. This vinylidene fluoride homopolymer solution had a Tc of 20° C.

Two gear pumps were disposed to thereby pressurize the solution to 2.0 MPa in the line between the pumps and allow the pressurized solution to stay for 20 seconds at 64-66° C. Thereafter, the polymer solution was ejected through the outer orifice of a double tube-type spinneret while simultaneously ejecting a 90% by weight aqueous solution of dimethyl sulfoxide through the inner orifice of the double tube-type spinneret. The ejected polymer solution was allowed to stay for 20 seconds in a cooling bath having a temperature of 0° C. and containing an 85% by weight aqueous solution of dimethyl sulfoxide, thereby solidifying the polymer solution.

The hollow fiber obtained had fibrous textures having a thickness uniformity of 0.42. The occupancy of the fibrous textures was 88%, and the occupancy of spherical textures was 12%.

Subsequently, the hollow fiber obtained above was drawn in 95° C. water 1.5 times. The drawn hollow fiber had fibrous textures having a longitudinal length of 14 µm, a short-side length of 1.2 µm, and a thickness uniformity of 0.41 and had a porosity of 71%. The vinylidene fluoride homopolymer molecular chains in the hollow fiber were in a non-oriented state and had an average value ν of Raman orientation parameter of 1.04 and an M/m of 1.1. The structure and performances of the drawn hollow fiber are shown in Table 2.

Furthermore, 14% by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a polymer solution.

This membrane-forming raw liquid was evenly applied to the hollow fiber obtained by the operation described above, and was immediately coagulated in a 50° C. water bath, thereby producing a composite porous hollow-fiber membrane having both the fibrous textures and a three-dimensional network texture disposed on the outer side thereof.

The composite porous hollow-fiber membrane obtained had an outer diameter of 1,330 µm and an inner diameter of 770 µm, and the outer layer had an average surface-pore diameter of 0.04 µm and an average thickness of 35 µm. The structure and performances of the composite porous hollow-fiber membrane are shown in Table 2.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 34 kPa. However, on the twelfth day after initiation of the operation, fiber breakage occurred and the water of Lake Biwa leaked out to the filtrate side. The filtration was hence stopped.

Comparative Example 8

Twenty-eight percent by weight vinylidene fluoride homopolymer (KF1300, manufactured by Kureha Corp.; weight-average molecular weight, 417,000; number-average molecular weight, 221,000) and 72% by weight dimethyl sulfoxide were dissolved at 130° C. This vinylidene fluoride homopolymer solution had a Tc of 20° C.

Two gear pumps were disposed to thereby pressurize the solution to 2.0 MPa in the line between the pumps and allow the pressurized solution to stay for 20 seconds at 64-66° C. Thereafter, the polymer solution was ejected through the outer orifice of a double tube-type spinneret while simultaneously ejecting a 90% by weight aqueous solution of dimethyl sulfoxide through the inner orifice of the double tube-type spinneret. The ejected polymer solution was allowed to stay for 20 seconds in a cooling bath having a temperature of 0° C. and containing an 85% by weight aqueous solution of dimethyl sulfoxide, thereby solidifying the polymer solution.

The hollow fiber obtained had fibrous textures having a thickness uniformity of 0.42. The occupancy of the fibrous textures was 88%, and the occupancy of spherical textures was 12%.

Subsequently, the hollow fiber obtained above was drawn in 95° C. water 2.5 times. The drawn hollow fiber had fibrous textures having a longitudinal length of 19 μm, a short-side length of 0.8 μm, and a thickness uniformity of 0.37 and had a porosity of 73%. The vinylidene fluoride homopolymer molecular chains in the hollow fiber were in a non-oriented state and had an average value v of Raman orientation parameter of 1.06 and an M/m of 1.2. The structure and performances of the drawn hollow fiber are shown in Table 2.

Furthermore, 14% by weight vinylidene fluoride homopolymer having a weight-average molecular weight of 284,000, 1% by weight cellulose acetate (CA435-75S, manufactured by Eastman Chemical Company; cellulose triacetate), 77% by weight N-methyl-2-pyrrolidone, 5% by weight polyoxyethylene coconut oil fatty acid sorbitan (trade name IONET T-20C, manufactured by Sanyo Chemical Industries, Ltd.), and 3% by weight water were mixed together and dissolved at a temperature of 95° C. to prepare a polymer solution.

This membrane-forming raw liquid was evenly applied to the hollow fiber obtained by the operation described above, and was immediately coagulated in a 50° C. water bath, thereby producing a composite porous hollow-fiber membrane having both the fibrous textures and a three-dimensional network texture disposed on the outer side thereof.

The composite porous hollow-fiber membrane obtained had an outer diameter of 1,330 μm and an inner diameter of 770 μm, and the outer layer had an average surface-pore diameter of 0.04 μm and an average thickness of 35 μm. The structure and performances of the composite porous hollow-fiber membrane are shown in Table 2.

The thus-obtained composite porous hollow-fiber membrane was used to fabricate a composite porous hollow-fiber membrane module in the same manner as in Example 1, and an operation of filtrating the water of Lake Biwa was performed. As a result, the filtration pressure difference at initiation of the filtration operation was 34 kPa. However, on the fifteenth day after initiation of the operation, fiber breakage occurred and the water of Lake Biwa leaked out to the filtrate side. The filtration was hence stopped.

Comparative Example 9

Fifteen percent by weight vinylidene fluoride homopolymer (KF1300, manufactured by Kureha Corp.; weight-average molecular weight, 417,000; number-average molecular weight, 221,000) and 85% by weight dimethylacetamide were dissolved at 100° C. This vinylidene fluoride homopolymer solution had no Tc because dimethylacetamide was a good solvent for the vinylidene fluoride homopolymer.

Two gear pumps were disposed to thereby pressurize the solution to 0.2 MPa in the line between the pumps and allow the pressurized solution to stay for 20 seconds at 99-101° C. Thereafter, the polymer solution was ejected through the outer orifice of a double tube-type spinneret while simultaneously ejecting an 85% by weight aqueous solution of dimethylacetamide through the inner orifice of the double tube-type spinneret. The ejected polymer solution was allowed to stay for 40 seconds in a cooling bath having a temperature of 25° C. and containing an 85% by weight aqueous solution of dimethylacetamide, thereby solidifying the polymer solution.

The porous hollow-fiber membrane obtained had neither spherical textures nor fibrous textures nor columnar textures and had a three-dimensional network structure.

Subsequently, it was attempted to draw the thus-obtained hollow fiber in 95° C. water 2 times. However, fiber breakage occurred to make the drawing impossible.

Comparative Example 10

The porous hollow-fiber membrane obtained in Example 1 which had no three-dimensional network texture and had a columnar texture was used to fabricate a porous hollow-fiber membrane module in the same manner as in Example 1, and an operation of filtrating the water of Lake Biwa was performed. As a result, the filtration pressure difference at initiation of the filtration operation was 22 kPa and the filtration pressure difference at termination of the filtration operation was 152 kPa, showing that the filtration pressure difference at initiation of the filtration operation was low. The rate of increase in filtration pressure difference was as high as 591%. This module was found to be unable to be stably operated. It was thus found that the obtained porous hollow-fiber membrane, although having excellent physical durability, gave a module which had poor operability and hence was unable to be stably operated over a long period.

Comparative Example 11

A porous hollow-fiber membrane module fabricated using the porous hollow-fiber membrane produced in Example 1 which had no three-dimensional network texture and had a columnar texture was used in the filtration device of FIG. 7 to perform cross flow filtration of beer. As the beer, use was made of Fujizakura Heights Beer Pils (manufactured by Fuji Kanko Kaihatsu Co., Ltd.), which was commercial unfiltered beer. The cross flow filtration was conducted at a membrane-surface linear velocity of 0.5 m/s and a filtration rate per unit membrane area (filtration flux) of 2 m$^3$/m$^2$/d. The filtration was stopped at the time when the difference between the pressure on the side where the liquid to be filtrated was present and the pressure on the filtrate side (transmembrane pressure difference) reached 100 kPa. The transmembrane pressure difference reached 100 kPa at 2.4 hours after initiation of the filtration.

TABLE 1

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Structure of inner layer before drawing | Concentration of fluororesin-based polymer (wt %) | 36 | 36 | 38 | 38 | 40 | 40 | 40 | 40 | 40 | 40 | 40 | 40 | 40 |
| | Kind of solvent | γ-butyrolactone | | | | | dimethyl sulfoxide | | | | | | | |
| | Crystallization temperature Tc (° C.) | 48 | 48 | 51 | 51 | 30 | 30 | 30 | 30 | 30 | 30 | 30 | 30 | 30 |
| | Temperature of first cooling bath (° C.) | 25 | 5 | 5 | 5 | 20 | −5 | −5 | −5 | −5 | −5 | −5 | −5 | −5 |
| | Time in first cooling bath (sec) | 20 | 10 | 10 | 10 | 20 | 10 | 10 | 10 | 10 | 10 | 10 | 10 | 10 |
| | Temperature of second cooling bath (° C.) | — | 25 | 35 | 35 | — | 15 | 20 | 20 | 20 | 20 | 20 | 20 | 20 |
| | Time in second cooling bath (sec) | — | 20 | 50 | 50 | — | 30 | 50 | 50 | 50 | 50 | 50 | 50 | 50 |
| | Thickness uniformity | 0.62 | 0.65 | 0.66 | 0.66 | 0.62 | 0.72 | 0.72 | 0.72 | 0.72 | 0.72 | 0.72 | 0.72 | 0.72 |
| | Occupancy of spherical texture (%) | 14 | 13 | 9 | 9 | 7 | 8 | 5 | 5 | 5 | 5 | 5 | 5 | 5 |
| Structure of inner layer after drawing | Draw ratio (times) | 2.5 | 3 | 3 | 3.5 | 2.5 | 3 | 3.5 | 4 | 4 | 4 | 4 | 4 | 4 |
| | Degree of orientation π | 0.61 | 0.77 | 0.85 | 0.89 | 0.66 | 0.86 | 0.91 | 0.92 | 0.92 | 0.92 | 0.92 | 0.92 | 0.92 |
| | Thickness uniformity | 0.61 | 0.66 | 0.66 | 0.62 | 0.61 | 0.69 | 0.67 | 0.63 | 0.63 | 0.63 | 0.63 | 0.63 | 0.63 |
| | Porosity (%) | 55 | 61 | 59 | 61 | 64 | 64 | 65 | 66 | 66 | 66 | 66 | 66 | 66 |
| Performance of composite membrane | Pure-water permeation performance (m$^3$/m$^2$/h) | 0.6 | 0.8 | 0.7 | 0.8 | 0.6 | 0.7 | 0.8 | 0.8 | 0.8 | 0.8 | 1.4 | 2.1 | 0.8 |
| | Breaking strength (MPa) | 27 | 40 | 48 | 62 | 35 | 52 | 64 | 68 | 68 | 68 | 27 | 40 | 48 |
| | Average outer-surface pore diameter (μm) | 0.04 | 0.04 | 0.04 | 0.04 | 0.04 | 0.04 | 0.04 | 0.04 | 0.04 | 0.03 | 0.5 | 0.8 | 0.3 |
| | Rate of increase in filtration pressure difference (%) | 29 | 27 | 30 | 28 | 32 | 27 | 23 | 28 | 28 | 23 | — | — | — |
| | Time to reach 100 kPa (h) | — | — | — | — | — | — | — | — | — | — | 5.8 | 6.3 | 5.0 |

TABLE 2

| | | Comparative Example | | | | | |
|---|---|---|---|---|---|---|---|
| | | 1 | 2 | 3 | 4 | 5 | 6 |
| Structure of inner layer before drawing | Concentration of fluororesin-based polymer (wt %) | 38 | 38 | 38 | 36 | 40 | 40 |
| | Kind of solvent | γ-butyrolactone | | | | dimethyl sulfoxide | |
| | Crystallization temperature Tc (° C.) | 51 | 51 | 51 | 48 | 30 | 30 |
| | Temperature of first cooling bath (° C.) | 5 | 5 | 5 | 5 | 0 | 0 |
| | Time in first cooling bath (sec) | 20 | 20 | 20 | 20 | 20 | 20 |
| | Temperature of second cooling bath (° C.) | — | — | — | — | — | — |
| | Time in second cooling bath (sec) | — | — | — | — | — | — |
| | Thickness uniformity | 0.47 | 0.47 | 0.47 | 0.42 | 0.56 | 0.56 |
| | Occupancy of spherical texture (%) | 9 | 9 | 9 | 76 | 16 | 16 |
| Structure of inner layer after drawing | Draw ratio (times) | 1.5 | 2.5 | 3.5 | 2 | 1.5 | 2.5 |
| | Degree of orientation π | non-oriented | non-oriented | fiber breakage during drawing | fiber breakage during drawing | non-oriented | non-oriented |
| | Thickness uniformity | 0.45 | 0.42 | | | 0.53 | 0.51 |
| | Porosity (%) | 63 | 65 | | | 64 | 65 |
| Performance of composite membrane | Pure-water permeation performance (m$^3$/m$^2$/h) | 0.7 | 0.8 | | | 0.2 | 0.4 |
| | Breaking strength (MPa) | 14 | 18 | | | 18 | 23 |
| | Average outer-surface pore diameter (μm) | 0.04 | 0.04 | | | 0.04 | 0.04 |
| | Rate of increase in filtration pressure difference (%) | — | — | | | — | — |
| | Reason for stopping filtration | fiber breakage on 10th day | fiber breakage on 12th day | | | fiber breakage on 11th day | fiber breakage on 18th day |
| | Time to reach 100 kPa (h) | — | — | | | — | — |

TABLE 2-continued

|  |  | Comparative Example | | | | |
|---|---|---|---|---|---|---|
|  |  | 7 | 8 | 9 | 10 | 11 |
| Structure of inner layer before drawing | Concentration of fluororesin-based polymer (wt %) | 28 | 28 | 15 | 36 | 36 |
|  | Kind of solvent | dimethyl sulfoxide | dimethyl sulfoxide | dimethyl-acetamide | γ-butyrolactone | γ-butyrolactone |
|  | Crystallization temperature Tc (° C.) | 20 | 20 | — | 48 | 48 |
|  | Temperature of first cooling bath (° C.) | 0 | 0 | 25 | 25 | 25 |
|  | Time in first cooling bath (sec) | 20 | 20 | 40 | 20 | 20 |
|  | Temperature of second cooling bath (° C.) | — | — | — | — | — |
|  | Time in second cooling bath (sec) | — | — | — | — | — |
|  | Thickness uniformity | 0.42 | 0.42 | — | 0.62 | 0.62 |
|  | Occupancy of spherical texture (%) | 12 | 12 | — | 14 | 14 |
| Structure of inner layer after drawing | Draw ratio (times) | 1.5 | 2.5 | 2 | 2.5 | 2.5 |
|  | Degree of orientation π | non-oriented | non-oriented | fiber breakage during drawing | 0.61 | 0.61 |
|  | Thickness uniformity | 0.41 | 0.37 |  | 0.61 | 0.61 |
|  | Porosity (%) | 71 | 73 |  | 55 | 55 |
| Performance of composite membrane | Pure-water permeation performance (m³/m²/h) | 0.4 | 0.4 |  | 2.1 | 2.1 |
|  | Breaking strength (MPa) | 18 | 21 |  | 27 | 27 |
|  | Average outer-surface pore diameter (μm) | 0.04 | 0.04 |  | — | — |
|  | Rate of increase in filtration pressure difference (%) | — | — |  | 591 | — |
|  | Reason for stopping filtration | fiber breakage on 12th day | fiber breakage on 15th day |  | — | — |
|  | Time to reach 100 kPa (h) | — | — |  | — | 2.4 |

While the invention has been described in detail and with reference to specific embodiments thereof, it will be apparent to one skilled in the art that various changes and modifications can be made therein without departing from the spirit and scope thereof. This application is based on a Japanese patent application filed on Jun. 24, 2016 (Application No. 2016-125526), the contents thereof being incorporated herein by reference.

INDUSTRIAL APPLICABILITY

The present invention provides a composite porous hollow-fiber membrane which has excellent chemical durability due to a fluororesin-based polymer having high chemical resistance and which further has excellent physical durability and a controlled membrane-outer-surface pore diameter, thereby giving a composite porous hollow-fiber membrane module that can be stably operated over a long period while inhibiting the flow channels and the pores in the membranes from being clogged by microorganisms, etc.

The present invention further provides: a composite porous hollow-fiber membrane module which has excellent chemical durability due to the fluororesin-based polymer having high chemical resistance and in which pore clogging is inhibited; and methods for operating the module. This module, when applied in the fermentation industry or food industry, can be stably used for filtration over a prolonged period with occasional chemical cleaning.

DESCRIPTION OF REFERENCE NUMERALS AND SIGNS

100A Composite porous hollow-fiber membrane module
2 Composite porous hollow-fiber membrane
3 First binding part
4A Through hole
6 Upper cap
7 Lower cap
8 Filtrate outlet
9 Inlet for liquid to be filtrated
10 Gasket
11 Outlet for liquid to be filtrated (nozzle)
12 Composite porous hollow-fiber membrane bundle
13 Second binding part
14 Flow regulation hole
15 Flow regulation tube
16 Tank for liquid to be filtrated
17 Circulating pump for liquid to be filtrated
18 Flow meter for liquid to be filtrated
19 Pressure gauge for liquid to be filtrated
20 Composite porous hollow-fiber membrane module
21 Control valve for liquid to be filtrated
22 Flow meter for filtrate
23 Pressure gauge for filtrate
24 Filtrate withdrawal pump
25 Filtrate tank
26 Tub

The invention claimed is:

1. A composite porous hollow-fiber membrane comprising a first layer and a second layer which each comprise a fluororesin-based polymer, wherein
at least a part of molecular chains of the fluororesin-based polymer is oriented in a longitudinal direction of the composite porous hollow-fiber membrane,
the molecular chains of the fluororesin-based polymer have a degree of orientation π in the longitudinal direction of the composite porous hollow-fiber membrane of 0.4 or higher but less than 1.0, the degree of orientation π being calculated with the following formula (1),
the first layer has a columnar texture oriented in the longitudinal direction of the composite porous hollow-fiber membrane, the columnar texture has a short-side length of 0.5 μm to 3 μm and has an aspect ratio of 3 or higher, the second layer has a three-dimensional network texture and has an average surface-pore diameter of 5.0 nm to 5.0 μm:

$$\text{Degree of orientation } \pi = (180° - H)/180° \quad (1),$$

provided that H is a half-value width (°) of a circumferential-direction diffraction intensity distribution of a wide-angle X-ray diffraction image, and the short-side length and the aspect ratio of the columnar texture are measured by the following procedure:

the composite porous hollow-fiber membrane is cut along the longitudinal direction of the composite porous hollow-fiber membrane to obtain a section;

the section obtained is examined using a scanning electron microscope (SEM);

three arbitrarily selected fields of view each including five columnar textures are examined to obtain values of longitudinal length of the columnar textures, and an average value of the obtained values of longitudinal length of the columnar textures is determined as a representative value of the longitudinal lengths of the columnar textures;

in the three arbitrarily selected fields of view and at each of a given number of arbitrary measuring points, wherein the given number of arbitrary measuring points is a value obtained by dividing the longitudinal length (μm) by 1 μm while omitting any figures below the decimal point, a short-side length of one columnar texture is measured, and an average value of the obtained values of the short-side lengths is determined as a representative value of short-side length; and the aspect ratio of the columnar texture is calculated from the representative value of longitudinal length and the representative value of short-side length.

2. The composite porous hollow-fiber membrane according to claim 1, wherein the columnar texture has a short-side length of 0.5 μm to 3 μm and has an aspect ratio of 3 or higher.

3. The composite porous hollow-fiber membrane according to claim 1, wherein the columnar texture has a thickness uniformity of 0.60 or higher.

4. The composite porous hollow-fiber membrane according to claim 1, wherein the half-value width H is a half-value width of an intensity distribution obtained by wide-angle X-ray diffractometry, by scanning, in a circumferential direction, a crystal peak (2θ=20.4°) assigned to a (110) plane of poly(vinylidene fluoride).

5. The composite porous hollow-fiber membrane according to claim 1, wherein, in a case where measuring points on the composite porous hollow-fiber membrane which are located at intervals of 1 cm in the longitudinal direction thereof are examined by wide-angle X-ray diffractometry, the degree of orientation π is 0.4 or higher but less than 1.0 in 80% or more of the measuring points.

6. The composite porous hollow-fiber membrane according to claim 1, wherein the columnar texture has an average value v of a Raman orientation parameter obtained by Raman spectrometry of 3.0 or larger.

7. The composite porous hollow-fiber membrane according to claim 1, wherein the fluororesin-based polymer is poly(vinylidene fluoride).

8. The composite porous hollow-fiber membrane according to claim 1, wherein the first layer has a porosity of 50-80%.

9. The composite porous hollow-fiber membrane according to claim 1, which has a pure-water permeation performance at 50 kPa and 25° C. of 0.1 m³/m²/hr or higher and a breaking strength of 25 MPa or higher.

10. A composite porous hollow-fiber membrane module comprising:
- a tubular case having, in a height direction thereof, a first end and a second end;
- a plurality of the composite porous hollow-fiber membranes according to claim 1 disposed in the tubular case;
- a fluid inflow/outflow port located in a sidewall of the tubular case further toward the second-end side than the center of the tubular case; and
- a fluid inflow/outflow port located in a first-end-side end face of the tubular case,
- wherein hollows of the composite porous hollow-fiber membranes are opened on the second-end side and closed on the first-end side.

11. A method for operating the composite porous hollow-fiber membrane module according to claim 10, the method comprising simultaneously performing the following step (A) and step (B):
(A) a step in which a liquid to be filtrated is introduced into the tubular case through the fluid inflow/outflow port located in the first-end-side end face, and the liquid to be filtrated is discharged from the tubular case through the fluid inflow/outflow port located in the sidewall on the second-end side; and
(B) a step in which a filtrate is taken out from the hollows of the composite porous hollow-fiber membranes toward the second end.

12. A method for operating the composite porous hollow-fiber membrane module according to claim 10, the method comprising simultaneously performing the following step (B) and step (C):
(B) a step in which a filtrate is taken out from the hollows of the composite porous hollow-fiber membranes toward the second end; and
(C) a step in which a liquid to be filtrated is introduced into the tubular case through the fluid inflow/outflow port located in the sidewall on the second-end side, and the liquid to be filtrated is discharged from the tubular case through the fluid inflow/outflow port located in the first-end-side end face.

13. The method for operating the composite porous hollow-fiber membrane module according to claim 11, wherein the step (B) and the following step (D) are repeatedly performed:
(D) a step in which, after the step (B), a fluid is filtrated by passing the fluid from the hollows of the composite porous hollow-fiber membranes on the second-end side to an outside of the composite porous hollow-fiber membranes.

14. The method for operating the composite porous hollow-fiber membrane module according to claim 13, wherein the step (B) and the step (D) are repeatedly performed and the following step (E) is further performed:
(E) a step in which a gas is introduced into the tubular case through the fluid inflow/outflow port located in the first-end-side end face, and the gas is discharged from the tubular case through the fluid inflow/outflow port located in the sidewall on the second-end side.

15. The method for operating the composite porous hollow-fiber membrane module according to claim 12, wherein the step (B) and the following step (D) are repeatedly performed:

(D) a step in which, after the step (B), a fluid is filtrated by passing the fluid from the hollows of the composite porous hollow-fiber membranes on the second-end side to an outside of the composite porous hollow-fiber membranes.

16. The method for operating the composite porous hollow-fiber membrane module according to claim 15, wherein the step (B) and the step (D) are repeatedly performed and the following step (E) is further performed:

(E) a step in which a gas is introduced into the tubular case through the fluid inflow/outflow port located in the first-end-side end face, and the gas is discharged from the tubular case through the fluid inflow/outflow port located in the sidewall on the second-end side.

17. The composite porous hollow-fiber membrane according to claim 1, wherein a proportion of the columnar texture in the first layer is 80% by weight or higher.

* * * * *